(12) United States Patent
Harel et al.

(10) Patent No.: US 9,172,446 B2
(45) Date of Patent: Oct. 27, 2015

(54) METHOD AND SYSTEM FOR SUPPORTING SPARSE EXPLICIT SOUNDING BY IMPLICIT DATA

(71) Applicant: Magnolia Broadband Inc., Englewood, NJ (US)

(72) Inventors: Haim Harel, New York, NY (US); Phil F. Chen, Denville, NJ (US); Stuart S. Jeffery, Los Altos, CA (US); Kenneth Kludt, San Jose, CA (US); Thorp Rivingston, Long Branch, NJ (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/480,920

(22) Filed: Sep. 9, 2014

(65) Prior Publication Data

US 2015/0270880 A1    Sep. 24, 2015

Related U.S. Application Data

(63) Continuation-in-part of application No. 14/449,431, filed on Aug. 1, 2014.

(60) Provisional application No. 61/955,433, filed on Mar. 19, 2014, provisional application No. 61/971,200, filed on Mar. 27, 2014.

(51) Int. Cl.
*H04L 12/26* (2006.01)
*H04B 7/04* (2006.01)
(Continued)

(52) U.S. Cl.
CPC ............. *H04B 7/0452* (2013.01); *H04W 84/12* (2013.01); *H04W 88/08* (2013.01)

(58) Field of Classification Search
CPC ............................ H04L 25/0226; H04W 16/28
USPC .......................................................... 370/220
See application file for complete search history.

(56) References Cited

U.S. PATENT DOCUMENTS

| | | | |
|---|---|---|---|
| 4,044,359 A | 8/1977 | Applebaum et al. | |
| 4,079,318 A | 3/1978 | Kinoshita | |

(Continued)

FOREIGN PATENT DOCUMENTS

| | | |
|---|---|---|
| EP | 1 189 303 | 3/2002 |
| EP | 1 867 177 | 5/2010 |

(Continued)

OTHER PUBLICATIONS

Office Action issued for U.S. Appl. No. 13/630,146 dated Jan. 22, 2013.

(Continued)

*Primary Examiner* — Dang Ton
*Assistant Examiner* — Lionel Preval
(74) *Attorney, Agent, or Firm* — Pearl Cohen Zedek Latzer Baratz LLP

(57) ABSTRACT

A method and apparatus for an access point (AP) accessing a channel occupied by a neighboring AP within clear channel assessment (CCA) range. The method is implemented by setting a transmit null towards the neighboring AP, while acquiring accurate channel knowledge with minimal bandwidth penalty to surrounding networks, via a combination of sparse explicit sounding, and a following implicit channel estimation of the neighboring APs for updating the explicit data achieved by the sparse explicit sounding. An AP implementing the method is also disclosed.

26 Claims, 17 Drawing Sheets

(51) Int. Cl.
  *H04W 88/08* (2009.01)
  *H04W 84/12* (2009.01)

(56) References Cited

U.S. PATENT DOCUMENTS

| | | |
|---|---|---|
| 4,359,738 A | 11/1982 | Lewis |
| 4,540,985 A | 9/1985 | Clancy et al. |
| 4,628,320 A | 12/1986 | Downie |
| 5,162,805 A | 11/1992 | Cantrell |
| 5,363,104 A | 11/1994 | Richmond |
| 5,444,762 A | 8/1995 | Frey et al. |
| 5,732,075 A | 3/1998 | Tangemann et al. |
| 5,915,215 A | 6/1999 | Williams et al. |
| 5,936,577 A | 8/1999 | Shoki et al. |
| 5,940,033 A | 8/1999 | Locher et al. |
| 6,018,317 A | 1/2000 | Dogan et al. |
| 6,026,081 A | 2/2000 | Hamabe |
| 6,046,655 A | 4/2000 | Cipolla |
| 6,094,165 A | 7/2000 | Smith |
| 6,101,399 A | 8/2000 | Raleigh et al. |
| 6,163,695 A | 12/2000 | Takemura |
| 6,167,286 A | 12/2000 | Ward et al. |
| 6,215,812 B1 | 4/2001 | Young et al. |
| 6,226,507 B1 | 5/2001 | Ramesh et al. |
| 6,230,123 B1 | 5/2001 | Mekuria et al. |
| 6,259,683 B1 | 7/2001 | Sekine et al. |
| 6,297,772 B1 | 10/2001 | Lewis |
| 6,321,077 B1 | 11/2001 | Saitoh et al. |
| 6,335,953 B1 | 1/2002 | Sanderford et al. |
| 6,370,378 B1 | 4/2002 | Yahagi |
| 6,377,783 B1 | 4/2002 | Lo et al. |
| 6,393,282 B1 | 5/2002 | Iimori |
| 6,584,115 B1 | 6/2003 | Suzuki |
| 6,647,276 B1 | 11/2003 | Kuwahara et al. |
| 6,697,622 B1 | 2/2004 | Ishikawa et al. |
| 6,697,633 B1 | 2/2004 | Dogan et al. |
| 6,735,182 B1 | 5/2004 | Nishimori et al. |
| 6,834,073 B1 | 12/2004 | Miller et al. |
| 6,842,460 B1 | 1/2005 | Olkkonen et al. |
| 6,914,890 B1 | 7/2005 | Tobita et al. |
| 6,927,646 B2 | 8/2005 | Niemi |
| 6,934,541 B2 | 8/2005 | Miyatani |
| 6,975,582 B1 | 12/2005 | Karabinis et al. |
| 6,987,958 B1 | 1/2006 | Lo et al. |
| 7,068,628 B2 | 6/2006 | Li et al. |
| 7,154,960 B2 | 12/2006 | Liu et al. |
| 7,177,663 B2 | 2/2007 | Axness et al. |
| 7,190,964 B2 | 3/2007 | Damnjanovic et al. |
| 7,257,425 B2 | 8/2007 | Wang et al. |
| 7,299,072 B2 | 11/2007 | Ninomiya |
| 7,391,757 B2 | 6/2008 | Haddad et al. |
| 7,392,015 B1 | 6/2008 | Farlow et al. |
| 7,474,676 B2 | 1/2009 | Tao et al. |
| 7,499,109 B2 | 3/2009 | Kim et al. |
| 7,512,083 B2 | 3/2009 | Li |
| 7,606,528 B2 | 10/2009 | Mesecher |
| 7,634,015 B2 | 12/2009 | Waxman |
| 7,646,744 B2 | 1/2010 | Li |
| 7,719,993 B2 | 5/2010 | Li et al. |
| 7,742,000 B2 | 6/2010 | Mohamadi |
| 7,769,107 B2 | 8/2010 | Sandhu et al. |
| 7,876,848 B2 | 1/2011 | Han et al. |
| 7,881,401 B2 | 2/2011 | Kraut et al. |
| 7,898,478 B2 | 3/2011 | Niu et al. |
| 7,904,086 B2 | 3/2011 | Kundu et al. |
| 7,904,106 B2 | 3/2011 | Han et al. |
| 7,933,255 B2 | 4/2011 | Li |
| 7,970,366 B2 | 6/2011 | Arita et al. |
| 8,078,109 B1 | 12/2011 | Mulcay |
| 8,103,284 B2 | 1/2012 | Mueckenheim et al. |
| 8,111,782 B2 | 2/2012 | Kim et al. |
| 8,115,679 B2 | 2/2012 | Falk |
| 8,155,613 B2 | 4/2012 | Kent et al. |
| 8,194,602 B2 | 6/2012 | van Rensburg et al. |
| 8,275,377 B2 | 9/2012 | Nanda et al. |
| 8,280,443 B2 | 10/2012 | Tao et al. |
| 8,294,625 B2 | 10/2012 | Kittinger et al. |
| 8,306,012 B2 | 11/2012 | Lindoff et al. |
| 8,315,671 B2 | 11/2012 | Kuwahara et al. |
| 8,369,436 B2 | 2/2013 | Stirling-Gallacher |
| 8,504,098 B2 | 8/2013 | Khojastepour |
| 8,509,190 B2 | 8/2013 | Rofougaran |
| 8,520,657 B2 | 8/2013 | Rofougaran |
| 8,526,886 B2 | 9/2013 | Wu et al. |
| 8,571,127 B2 | 10/2013 | Jiang et al. |
| 8,588,844 B2 | 11/2013 | Shpak |
| 8,599,955 B1 | 12/2013 | Kludt et al. |
| 8,599,979 B2 | 12/2013 | Farag et al. |
| 8,605,658 B2 | 12/2013 | Fujimoto |
| 8,611,288 B1 | 12/2013 | Zhang et al. |
| 8,644,413 B2 | 2/2014 | Harel et al. |
| 8,649,458 B2 | 2/2014 | Kludt et al. |
| 8,666,319 B2 | 3/2014 | Kloper et al. |
| 8,670,504 B2 | 3/2014 | Naguib |
| 8,744,511 B2 | 6/2014 | Jones et al. |
| 8,754,810 B2 | 6/2014 | Guo et al. |
| 8,767,862 B2 | 7/2014 | Abreu et al. |
| 8,780,743 B2 | 7/2014 | Sombrutzki et al. |
| 8,797,969 B1 | 8/2014 | Harel et al. |
| 8,891,598 B1 | 11/2014 | Wang et al. |
| 8,928,528 B2 | 1/2015 | Harel et al. |
| 8,942,134 B1 | 1/2015 | Kludt et al. |
| 8,976,845 B2 | 3/2015 | O'Keeffe et al. |
| 8,995,416 B2 | 3/2015 | Harel et al. |
| 9,014,066 B1 | 4/2015 | Wang et al. |
| 9,035,828 B2 | 5/2015 | O'Keeffe et al. |
| 2001/0029326 A1 | 10/2001 | Diab et al. |
| 2001/0038665 A1 | 11/2001 | Baltersee et al. |
| 2002/0024975 A1 | 2/2002 | Hendler |
| 2002/0051430 A1 | 5/2002 | Kasami et al. |
| 2002/0065107 A1 | 5/2002 | Harel et al. |
| 2002/0085643 A1 | 7/2002 | Kitchener et al. |
| 2002/0107013 A1 | 8/2002 | Fitzgerald |
| 2002/0115474 A1 | 8/2002 | Yoshino et al. |
| 2002/0181426 A1 | 12/2002 | Sherman |
| 2002/0181437 A1 | 12/2002 | Ohkubo et al. |
| 2003/0087645 A1 | 5/2003 | Kim et al. |
| 2003/0114162 A1 | 6/2003 | Chheda et al. |
| 2003/0153322 A1 | 8/2003 | Burke et al. |
| 2003/0153360 A1 | 8/2003 | Burke et al. |
| 2003/0186653 A1 | 10/2003 | Mohebbi et al. |
| 2003/0203717 A1 | 10/2003 | Chuprun et al. |
| 2003/0203743 A1 | 10/2003 | Sugar et al. |
| 2004/0023693 A1 | 2/2004 | Okawa et al. |
| 2004/0056795 A1 | 3/2004 | Ericson et al. |
| 2004/0063455 A1 | 4/2004 | Eran et al. |
| 2004/0081144 A1 | 4/2004 | Martin et al. |
| 2004/0121810 A1 | 6/2004 | Goransson et al. |
| 2004/0125899 A1 | 7/2004 | Li et al. |
| 2004/0125900 A1 | 7/2004 | Liu et al. |
| 2004/0142696 A1 | 7/2004 | Saunders et al. |
| 2004/0147266 A1 | 7/2004 | Hwang et al. |
| 2004/0156399 A1 | 8/2004 | Eran |
| 2004/0166902 A1 | 8/2004 | Castellano et al. |
| 2004/0198292 A1 | 10/2004 | Smith et al. |
| 2004/0228388 A1 | 11/2004 | Salmenkaita |
| 2004/0235527 A1 | 11/2004 | Reudink et al. |
| 2004/0264504 A1 | 12/2004 | Jin |
| 2005/0068230 A1 | 3/2005 | Munoz et al. |
| 2005/0068918 A1 | 3/2005 | Mantravadi et al. |
| 2005/0075140 A1 | 4/2005 | Famolari |
| 2005/0085266 A1 | 4/2005 | Narita |
| 2005/0129155 A1 | 6/2005 | Hoshino |
| 2005/0147023 A1 | 7/2005 | Stephens et al. |
| 2005/0163097 A1 | 7/2005 | Do et al. |
| 2005/0245224 A1 | 11/2005 | Kurioka |
| 2005/0250544 A1 | 11/2005 | Grant et al. |
| 2005/0254513 A1 | 11/2005 | Cave et al. |
| 2005/0265436 A1 | 12/2005 | Suh et al. |
| 2005/0286440 A1 | 12/2005 | Strutt et al. |
| 2005/0287962 A1 | 12/2005 | Mehta et al. |
| 2006/0041676 A1 | 2/2006 | Sherman |
| 2006/0092889 A1 | 5/2006 | Lyons et al. |
| 2006/0094372 A1 | 5/2006 | Ahn et al. |

(56) References Cited

U.S. PATENT DOCUMENTS

| | | |
|---|---|---|
| 2006/0098605 A1 | 5/2006 | Li |
| 2006/0111149 A1 | 5/2006 | Chitrapu et al. |
| 2006/0135097 A1 | 6/2006 | Wang et al. |
| 2006/0183503 A1 | 8/2006 | Goldberg |
| 2006/0203850 A1 | 9/2006 | Johnson et al. |
| 2006/0227854 A1 | 10/2006 | McCloud et al. |
| 2006/0264184 A1 | 11/2006 | Li et al. |
| 2006/0270343 A1 | 11/2006 | Cha et al. |
| 2006/0271969 A1 | 11/2006 | Takizawa et al. |
| 2006/0285507 A1 | 12/2006 | Kinder et al. |
| 2007/0041398 A1 | 2/2007 | Benveniste |
| 2007/0058581 A1 | 3/2007 | Benveniste |
| 2007/0076675 A1 | 4/2007 | Chen |
| 2007/0093261 A1 | 4/2007 | Hou et al. |
| 2007/0097918 A1 | 5/2007 | Cai et al. |
| 2007/0115882 A1 | 5/2007 | Wentink |
| 2007/0115914 A1 | 5/2007 | Ohkubo et al. |
| 2007/0152903 A1 | 7/2007 | Lin et al. |
| 2007/0217352 A1 | 9/2007 | Kwon |
| 2007/0223380 A1 | 9/2007 | Gilbert et al. |
| 2007/0249386 A1 | 10/2007 | Bennett |
| 2007/0298742 A1 | 12/2007 | Ketchum et al. |
| 2008/0043867 A1 | 2/2008 | Blanz et al. |
| 2008/0051037 A1 | 2/2008 | Molnar et al. |
| 2008/0081671 A1 | 4/2008 | Wang et al. |
| 2008/0095163 A1 | 4/2008 | Chen et al. |
| 2008/0108352 A1 | 5/2008 | Montemurro et al. |
| 2008/0125120 A1 | 5/2008 | Gallagher et al. |
| 2008/0144737 A1 | 6/2008 | Naguib |
| 2008/0165732 A1 | 7/2008 | Kim et al. |
| 2008/0238808 A1 | 10/2008 | Arita et al. |
| 2008/0240314 A1 | 10/2008 | Gaal et al. |
| 2008/0247370 A1 | 10/2008 | Gu et al. |
| 2008/0267142 A1 | 10/2008 | Mushkin et al. |
| 2008/0280571 A1 | 11/2008 | Rofougaran et al. |
| 2008/0285637 A1 | 11/2008 | Liu et al. |
| 2009/0003299 A1 | 1/2009 | Cave et al. |
| 2009/0028225 A1 | 1/2009 | Runyon et al. |
| 2009/0046638 A1 | 2/2009 | Rappaport et al. |
| 2009/0058724 A1 | 3/2009 | Xia et al. |
| 2009/0121935 A1 | 5/2009 | Xia et al. |
| 2009/0137206 A1 | 5/2009 | Sherman et al. |
| 2009/0154419 A1 | 6/2009 | Yoshida et al. |
| 2009/0187661 A1 | 7/2009 | Sherman |
| 2009/0190541 A1 | 7/2009 | Abedi |
| 2009/0227255 A1 | 9/2009 | Thakare |
| 2009/0239486 A1 | 9/2009 | Sugar et al. |
| 2009/0268616 A1 | 10/2009 | Hosomi |
| 2009/0279478 A1 | 11/2009 | Nagaraj et al. |
| 2009/0285331 A1 | 11/2009 | Sugar et al. |
| 2009/0322610 A1 | 12/2009 | Hants et al. |
| 2009/0322613 A1 | 12/2009 | Bala et al. |
| 2009/0323608 A1 | 12/2009 | Adachi et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0087227 A1 | 4/2010 | Francos et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1 | 6/2010 | Hara et al. |
| 2010/0172429 A1 | 7/2010 | Nagahama et al. |
| 2010/0195560 A1 | 8/2010 | Nozaki et al. |
| 2010/0195601 A1 | 8/2010 | Zhang |
| 2010/0208712 A1 | 8/2010 | Wax et al. |
| 2010/0222011 A1 | 9/2010 | Behzad |
| 2010/0232355 A1 | 9/2010 | Richeson et al. |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085465 A1 | 4/2011 | Lindoff et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0250884 A1 | 10/2011 | Brunel et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2011/0310827 A1* | 12/2011 | Srinivasa et al. ............ 370/329 |
| 2011/0310853 A1 | 12/2011 | Yin et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0027000 A1 | 2/2012 | Wentink |
| 2012/0028638 A1 | 2/2012 | Mueck et al. |
| 2012/0028655 A1 | 2/2012 | Mueck et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0051287 A1* | 3/2012 | Merlin et al. ............... 370/328 |
| 2012/0064838 A1 | 3/2012 | Miao et al. |
| 2012/0069828 A1 | 3/2012 | Taki et al. |
| 2012/0076028 A1 | 3/2012 | Ko et al. |
| 2012/0076229 A1 | 3/2012 | Brobston et al. |
| 2012/0088512 A1 | 4/2012 | Yamada et al. |
| 2012/0092217 A1* | 4/2012 | Hosoya et al. ............... 342/373 |
| 2012/0100802 A1 | 4/2012 | Mohebbi |
| 2012/0115523 A1 | 5/2012 | Shpak |
| 2012/0155349 A1 | 6/2012 | Bajic et al. |
| 2012/0155397 A1 | 6/2012 | Shaffer et al. |
| 2012/0163257 A1 | 6/2012 | Kim et al. |
| 2012/0163302 A1 | 6/2012 | Takano |
| 2012/0170453 A1 | 7/2012 | Tiwari |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0213065 A1 | 8/2012 | Koo et al. |
| 2012/0218962 A1 | 8/2012 | Kishiyama et al. |
| 2012/0220331 A1 | 8/2012 | Luo et al. |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0281598 A1 | 11/2012 | Struhsaker et al. |
| 2012/0314570 A1 | 12/2012 | Forenza et al. |
| 2012/0321015 A1 | 12/2012 | Hansen et al. |
| 2012/0327870 A1 | 12/2012 | Grandhi et al. |
| 2013/0010623 A1 | 1/2013 | Golitschek |
| 2013/0012134 A1 | 1/2013 | Jin et al. |
| 2013/0017794 A1 | 1/2013 | Kloper et al. |
| 2013/0023225 A1 | 1/2013 | Weber |
| 2013/0044877 A1 | 2/2013 | Liu et al. |
| 2013/0051283 A1 | 2/2013 | Lee et al. |
| 2013/0058239 A1 | 3/2013 | Wang et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0150012 A1 | 6/2013 | Chhabra et al. |
| 2013/0156016 A1 | 6/2013 | Debnath et al. |
| 2013/0156120 A1 | 6/2013 | Josiam et al. |
| 2013/0170388 A1 | 7/2013 | Ito et al. |

(56) References Cited

U.S. PATENT DOCUMENTS

| | | | |
|---|---|---|---|
| 2013/0172029 A1 | 7/2013 | Chang et al. | |
| 2013/0188541 A1 | 7/2013 | Fischer | |
| 2013/0190006 A1 | 7/2013 | Kazmi et al. | |
| 2013/0208587 A1 | 8/2013 | Bala et al. | |
| 2013/0208619 A1 | 8/2013 | Kudo et al. | |
| 2013/0223400 A1 | 8/2013 | Seo et al. | |
| 2013/0229996 A1 | 9/2013 | Wang et al. | |
| 2013/0229999 A1 | 9/2013 | Da Silva et al. | |
| 2013/0235720 A1 | 9/2013 | Wang et al. | |
| 2013/0242853 A1 | 9/2013 | Seo et al. | |
| 2013/0242899 A1 | 9/2013 | Lysejko et al. | |
| 2013/0242965 A1 | 9/2013 | Horn et al. | |
| 2013/0242976 A1 | 9/2013 | Katayama et al. | |
| 2013/0252621 A1 | 9/2013 | Dimou et al. | |
| 2013/0272437 A1 | 10/2013 | Eidson et al. | |
| 2013/0301551 A1 | 11/2013 | Ghosh et al. | |
| 2013/0304962 A1 | 11/2013 | Yin et al. | |
| 2013/0331136 A1 | 12/2013 | Yang et al. | |
| 2013/0343369 A1 | 12/2013 | Yamaura | |
| 2014/0010089 A1 | 1/2014 | Cai et al. | |
| 2014/0010211 A1 | 1/2014 | Asterjadhi et al. | |
| 2014/0029433 A1 | 1/2014 | Wentink | |
| 2014/0071873 A1 | 3/2014 | Wang et al. | |
| 2014/0079016 A1 | 3/2014 | Dai et al. | |
| 2014/0086077 A1 | 3/2014 | Safavi | |
| 2014/0086081 A1 | 3/2014 | Mack et al. | |
| 2014/0098681 A1* | 4/2014 | Stager et al. | 370/252 |
| 2014/0119288 A1 | 5/2014 | Zhu et al. | |
| 2014/0154992 A1 | 6/2014 | Silverman et al. | |
| 2014/0185501 A1 | 7/2014 | Park et al. | |
| 2014/0185535 A1 | 7/2014 | Park et al. | |
| 2014/0192820 A1 | 7/2014 | Azizi et al. | |
| 2014/0204821 A1 | 7/2014 | Seok et al. | |
| 2014/0241182 A1 | 8/2014 | Smadi | |
| 2014/0242914 A1 | 8/2014 | Monroe | |
| 2014/0269409 A1 | 9/2014 | Dimou et al. | |
| 2014/0307653 A1 | 10/2014 | Liu et al. | |
| 2015/0016438 A1 | 1/2015 | Harel et al. | |
| 2015/0018042 A1 | 1/2015 | Radulescu et al. | |
| 2015/0085777 A1 | 3/2015 | Seok | |
| 2015/0124634 A1 | 5/2015 | Harel et al. | |
| 2015/0139212 A1 | 5/2015 | Wang et al. | |

FOREIGN PATENT DOCUMENTS

| | | |
|---|---|---|
| EP | 2 234 355 | 9/2010 |
| EP | 2 498 462 | 9/2012 |
| JP | 2009-182441 | 8/2009 |
| JP | 2009-278444 | 11/2009 |
| WO | WO 03/047033 | 6/2003 |
| WO | WO 03/073645 | 9/2003 |
| WO | WO 2010/085854 | 8/2010 |
| WO | WO 2011/060058 | 5/2011 |
| WO | WO 2013/192112 | 12/2013 |

OTHER PUBLICATIONS

Office Action issued for U.S. Appl. No. 13/630,146 dated Mar. 27, 2013.
Office Action issued for U.S. Appl. No. 13/762,159 dated Apr. 16, 2013.
Office Action issued for U.S. Appl. No. 13/762,191 dated May 2, 2013.
Office Action issued for U.S. Appl. No. 13/762,188 dated May 15, 2013.
Office Action issued for U.S. Appl. No. 13/776,204 dated May 21, 2013.
Office Action issued for U.S. Appl. No. 13/770,255 dated Jun. 6, 2013.
Office Action issued for U.S. Appl. No. 13/776,068 dated Jun. 11, 2013.
Notice of Allowance issued for U.S. Appl. No. 13/762,159 dated Jun. 20, 2013.
Office Action issued for U.S. Appl. No. 13/775,886 dated Jul. 17, 2013.
Notice of Allowance issued for U.S. Appl. No. 13/762,191 dated Jul. 19, 2013.
Notice of Allowance issued by the United States Patent and Trademark Office for U.S. Appl. No. 13/630,146 dated Jul. 31, 2013.
Notice of Allowance issued by the United States Patent and Trademark Office for U.S. Appl. No. 13/762,188 dated Aug. 19, 2013.
Notice of Allowance issued by the United States Patent and Trademark Office for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action issued by the United States Patent and Trademark Office for U.S. Appl. No. 13/889,150 dated Sep. 25, 2013.
Office Action issued by the United States Patent and Trademark Office for U.S. Appl. No. 13/955,320 dated Oct. 15, 2013.
Office Action issued by the United States Patent and Trademark Office for U.S. Appl. No. 13/776,204 dated Oct. 23, 2013.
Office Action issued by the United States Patent and Trademark Office for U.S. Appl. No. 13/925,454 dated Oct. 28, 2013.
Office Action issued by the United States Patent and Trademark Office for U.S. Appl. No. 13/955,194 dated Oct. 30, 2013.
Office Action issued by the United States Patent and Trademark Office for U.S. Appl. No. 14/013,190 dated Nov. 5, 2013.
Office Action issued by the United States Patent and Trademark Office for U.S. Appl. No. 13/776,068 dated Nov. 5, 2013.
Office Action issued by the United States Patent and Trademark Office for U.S. Appl. No. 14/010,771 dated Dec. 17, 2013.
Office Action issued by the United States Patent and Trademark Office for U.S. Appl. No. 14/065,182 dated Dec. 17, 2013.
Office Action issued by the United States Patent and Trademark Office for U.S. Appl. No. 14/068,863 dated Dec. 17, 2013.
Office Action issued by the United States Patent and Trademark Office for U.S. Appl. No. 14/011,521 dated Dec. 23, 2013.
Office Action issued by the United States Patent and Trademark Office for U.S. Appl. No. 13/775,886 dated Jan. 7, 2014.
Office Action issued by the United States Patent and Trademark Office for U.S. Appl. No. 14/018,965 dated Jan. 13, 2014.
Office Action issued by the United States Patent and Trademark Office for U.S. Appl. No. 13/858,302 dated Jan. 16, 2014.
Office Action issued by the United States Patent and Trademark Office for U.S. Appl. No. 14/042,020 dated Jan. 16, 2014.
Office Action issued by the United States Patent and Trademark Office for U.S. Appl. No. 14/102,539 dated Jan. 27, 2014.
Office Action issued by the United States Patent and Trademark Office for U.S. Appl. No. 14/087,376 dated Jan. 29, 2014.
Notice of Allowance issued by the United States Patent and Trademark Office for U.S. Appl. No. 13/776,204 dated Jan. 31, 2014.
Office Action issued by the United States Patent and Trademark Office for U.S. Appl. No. 14/094,644 dated Feb. 6, 2014.
Notice of Allowance issued by the United States Patent and Trademark Office for U.S. Appl. No. 13/955,320 dated Feb. 21, 2014.
Huang et al., "Antenna Mismatch and Calibration Problem in Coordinated Multi-point Transmission System," IET Communications, 2012, vol. 6, Issue 3, pp. 289-299.
Office Action issued by the United States Patent and Trademark Office for U.S. Appl. No. 14/109,904 dated Feb. 27, 2014.
Office Action issued by the United States Patent and Trademark Office for U.S. Appl. No. 13/925,454 dated Mar. 7, 2014.
Notice of Allowance issued by the United States Patent and Trademark Office for U.S. Appl. No. 14/172,500 dated Mar. 26, 2014.
Notice of Allowance issued by the United States Patent and Trademark Office for U.S. Appl. No. 14/065,182 dated Mar. 25, 2014.
Notice of Allowance issued by the United States Patent and Trademark Office for U.S. Appl. No. 14/068,863 dated Mar. 25, 2014.
Office Action issued by the United States Patent and Trademark Office for U.S. Appl. No. 14/010,771 dated Apr. 4, 2014.
Office Action issued by the United States Patent and Trademark Office for U.S. Appl. No. 14/085,352 dated Apr. 7, 2014.

(56) References Cited

OTHER PUBLICATIONS

Office Action issued by the United States Patent and Trademark Office for U.S. Appl. No. 13/889,150 dated Apr. 9, 2014.
Notice of Allowance issued by the United States Patent and Trademark Office for U.S. Appl. No. 13/955,194 dated Apr. 9, 2014.
Office Action issued by the United States Patent and Trademark Office for U.S. Appl. No. 14/097,765 dated Apr. 22, 2014.
Notice of Allowance issued by the United States Patent and Trademark Office for U.S. Appl. No. 14/087,376 dated May 9, 2014.
Office Action issued by the United States Patent and Trademark Office for U.S. Appl. No. 14/143,580 dated May 9, 2014.
Notice of Allowance issued by the United States Patent and Trademark Office for U.S. Appl. No. 13/776,068 dated May 13, 2014.
Office Action issued by the United States Patent and Trademark Office for U.S. Appl. No. 14/013,190 dated May 20, 2014.
Office Action issued by the United States Patent and Trademark Office for U.S. Appl. No. 14/085,252 dated Jun. 18, 2014.
Office Action issued by the United States Patent and Trademark Office for U.S. Appl. No. 14/094,644 dated Jun. 24, 2014.
Notice of Allowance issued by the United States Patent and Trademark Office for U.S. Appl. No. 14/102,539 dated Jun. 24, 2014.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 14/109,904 dated Jul. 2, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 28, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.
Office Action issued by the United States Patent and Trademark Office for U.S. Appl. No. 14/173,640 dated Oct. 6, 2014.
Office Action issued by the United States Patent and Trademark Office for U.S. Appl. No. 14/449,431 dated Oct. 10, 2014.
Office Action issued by the United States Patent and Trademark Office for U.S. Appl. No. 14/171,736 dated Oct. 16, 2014.
Notice of Allowance issued by the United States Patent and Trademark Office for U.S. Appl. No. 14/011,521 dated Oct. 20, 2014.
Office Action issued by the United States Patent and Trademark Office for U.S. Appl. No. 14/320,920 dated Oct. 23, 2014.
Notice of Allowance issued by the United States Patent and Trademark Office for U.S. Appl. No. 13/889,150 dated Nov. 10, 2014.
Office Action issued by the United States Patent and Trademark Office for U.S. Appl. No. 13/775,886 dated Nov. 17, 2014.
Notice of Allowance issued by the United States Patent and Trademark Office for U.S. Appl. No. 14/198,280 dated Nov. 18, 2014.
Office Action issued by the United States Patent and Trademark Office for U.S. Appl. No. 14/481,319 dated Nov. 19, 2014.
Office Action issued by the United States Patent and Trademark Office for U.S. Appl. No. 14/273,866 dated Nov. 28, 2014.
Office Action issued by the United States Patent and Trademark Office for U.S. Appl. No. 14/042,020 dated Dec. 1, 2014.
Office Action issued by the United States Patent and Trademark Office for U.S. Appl. No. 13/888,057 dated Dec. 3, 2014.
Notice of Allowance issued by the United States Patent and Trademark Office for U.S. Appl. No. 14/297,898 dated Dec. 5, 2014.
Notice of Allowance issued by the United States Patent and Trademark Office for U.S. Appl. No. 14/281,358 dated Dec. 16, 2014.
Office Action issued by the United States Patent and Trademark Office for U.S. Appl. No. 14/250,767 dated Dec. 26, 2014.
Notice of Allowance issued by the United States Patent and Trademark Office for U.S. Appl. No. 14/097,765 dated Dec. 31, 2014.
Office Action issued by the United States Patent and Trademark Office for U.S. Appl. No. 14/181,844 dated Jan. 5, 2015.
Office Action issued by the United States Patent and Trademark Office for U.S. Appl. No. 14/306,458 dated Jan. 9, 2015.
Notice of Allowance issued by the United States Patent and Trademark Office for U.S. Appl. No. 14/198,155 dated Jan. 26, 2015.
Notice of Allowance issued by the United States Patent and Trademark Office for U.S. Appl. No. 14/296,209 dated Jan. 27, 2015.
Notice of Allowance issued by the United States Patent and Trademark Office for U.S. Appl. No. 13/925,454 dated Feb. 3, 2015.
Office Action issued by the United States Patent and Trademark Office for U.S. Appl. No. 14/173,640 dated Feb. 3, 2015.
International Search Report and Written Opinion for International Application No. PCT/US14/65958 dated Jan. 13, 2015.
International Search Report and Written Opinion for PCT International Application No. PCT/US2014/064346 dated Jan. 29, 2015.
Mitsubishi Electric, "Discussion on Antenna Calibration in TDD", 3GPP Draft; R1-090043, $3^{rd}$ Generation Partnership Project (3GPP), Mobile Competence Centre; 650, Route Des Lucioles; F-06921 Sophia-Antipolis Cedex; France, No. Ljubljana; Jan. 7, 2009, pp. 1-4.
Alcatel-Lucent Shanghai Bell et al., "Antenna Array Calibration for TDD CoMP", 3GPP Draft; R1-100427, $3^{rd}$ Generation Partnership Project (3GPP), Mobile Competence Centre; 650, Route Des Lucioles; F-06921 Sophia-Antipolis Cedex; France, vol. RAN WG1, No. Valencia, Spain; Jan. 18, 2010, Jan. 12, 2010, pp. 1-5.
International Search Report and Written Opinion for PCT International Application No. PCT/US2014/064185 dated Feb. 5, 2015.
Kai Yang et al., "Coordinated Dual-Layer Beamforming for Public Safety Network: Architecture and Algorithms", Communications (ICC), 2012 IEEE International Conference On, IEEE, Jun. 10, 2012, pp. 4095-4099.
Songtao et al., "A Distributed Adaptive GSC Beamformer over Coordinated Antenna Arrays Network for Interference Mitigation", Asilomar Conference on Signals, Systems and Computers, Conference Record, IEEE Computer Society, US, Nov. 4, 2012, pp. 237-242.
International Search Report and Written Opinion for PCT International Application No. PCT/US2014/065635 dated Feb. 13, 2015.
Notice of Allowance issued by the United States Patent and Trademark Office for U.S. Appl. No. 14/171,736 mailed Feb. 20, 2015.
Office Action issued by the United States Patent and Trademark Office for U.S. Appl. No. 14/320,920 dated Feb. 23, 2015.
Office Action issued by the United States Patent and Trademark Office for U.S. Appl. No. 13/775,886 dated Mar. 23, 2015.
Notice of Allowance issued by the United States Patent and Trademark Office for U.S. Appl. No. 14/449,431 dated Mar. 23, 2015.
Notice of Allowance issued by the United States Patent and Trademark Office for U.S. Appl. No. 14/273,866 dated Mar. 25, 2015.
Office Action issued by the United States Patent and Trademark Office for U.S. Appl. No. 14/517,114 dated Apr. 6, 2015.
Notice of Allowance issued by the United States Patent and Trademark Office for U.S. Appl. No. 13/925,454 dated Apr. 14, 2015.

(56) References Cited

OTHER PUBLICATIONS

Office Action issued by the United States Patent and Trademark Office for U.S. Appl. No. 14/543,357 dated Apr. 23, 2015.
Office Action issued by the United States Patent and Trademark Office for U.S. Appl. No. 14/450,625 dated Apr. 28, 2015.
Office Action issued by the United States Patent and Trademark Office for U.S. Appl. No. 14/250,767 dated Apr. 29, 2015.
Office Action issued by the United States Patent and Trademark Office for U.S. Appl. No. 14/181,844 dated May 13, 2015.
Notice of Allowance issued by the United States Patent and Trademark Office for U.S. Appl. No. 13/775,886 dated May 26, 2015.
Office Action issued by the United States Patent and Trademark Office for U.S. Appl. No. 14/320,920 dated May 29, 2015.
Office Action issued by the United States Patent and Trademark Office for U.S. Appl. No. 14/481,319 dated Jun. 12, 2015.
Notice of Allowance issued by the United States Patent and Trademark Office for U.S. Appl. No. 14/505,655 dated Jun. 17, 2015.
Office Action issued by the United States Patent and Trademark Office for U.S. Appl. No. 14/472,759 dated Jun. 18, 2015.
Office Action issued by the United States Patent and Trademark Office for U.S. Appl. No. 14/042,020 dated Jun. 19, 2015.
International Search Report and Written Opinion for PCT International Application No. PCT/US2014/062116 dated Jun. 22, 2015.
Office Action issued by the United States Patent and Trademark Office for U.S. Appl. No. 14/467,415 dated Jun. 30, 2015.
International Search Report and Written Opinion for PCT International Application No. PCT/US2014/063304 dated Jul. 8, 2015.
Bandyopadhyay, S. et al., "An Adaptive MAC Protocol for Wireless Ad Hoc Community Network (WACNet) Using Electronically Steerable Passive Array Radiator Antenna", Globecom '01: IEEE Global Telecommunications Conference; San Antonio, Texas, USA, Nov. 25-29, 2001, IEEE Operations Center, Piscataway, NJ, vol. 5, Nov. 25, 2001, pp. 2896-2900.
Du, Yongjiu et al., "iBeam: Intelligent Client-Side Multi-User Beamforming in Wireless Networks", IEEE Infocom 2014—IEEE Conference on Computer Communications, IEEE, Apr. 27, 2014, pp. 817-825.
Office Action issued by the United States Patent and Trademark Office for Application No. 13/888,057 dated Jul. 9, 2015.
Office Action issued by the United States Patent and Trademark Office for U.S. Appl. No. 14/173,640 dated Jul. 16, 2015.
Office Action issued by the United States Patent and Trademark Office for Application No. 14/517,114 dated Jul. 28, 2015.
Office Action issued by the United States Patent and Trademark Office for Application No. 14/672,634 dated Aug. 12, 2015.

* cited by examiner

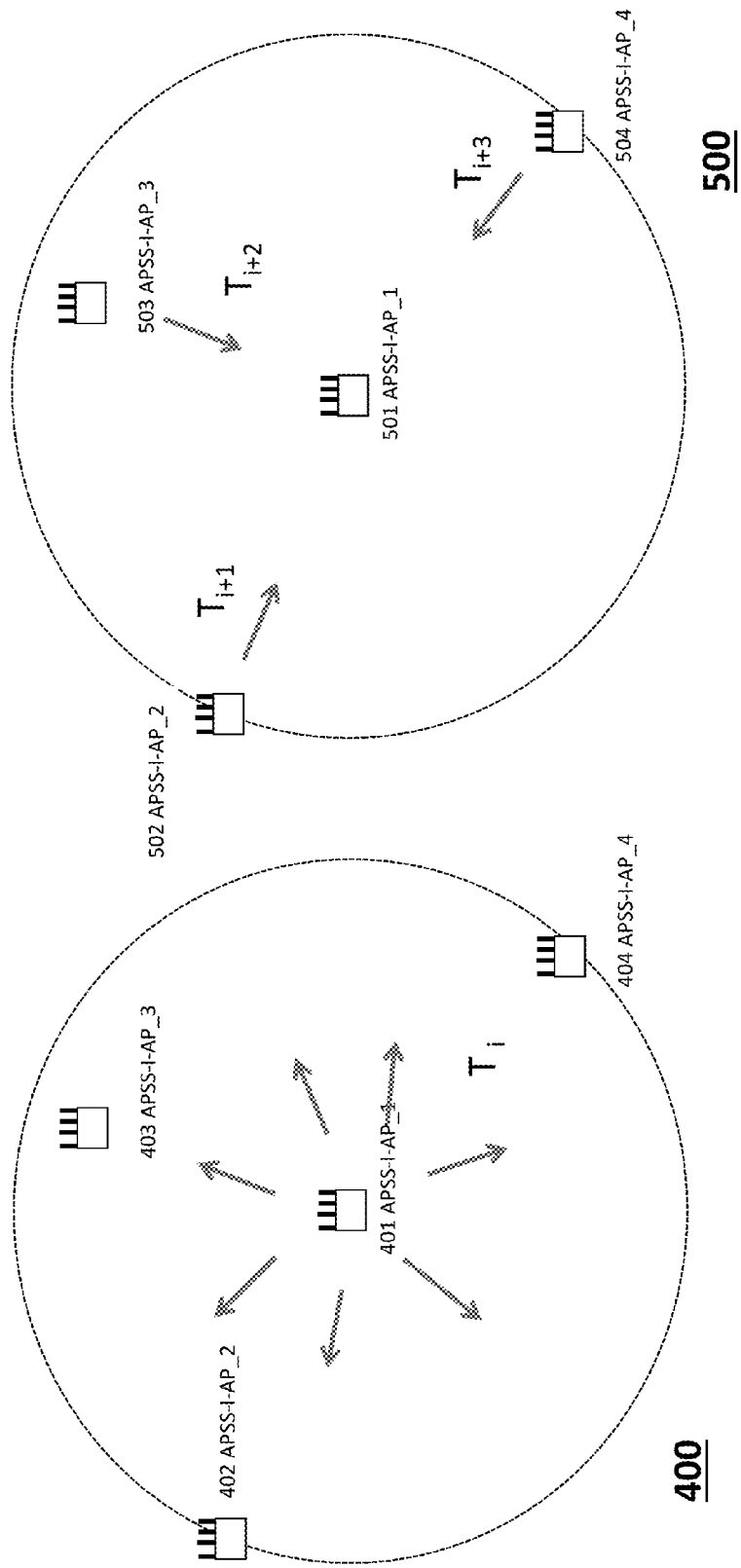

1400

METHOD AND SYSTEM FOR SUPPORTING SPARSE EXPLICIT SOUNDING BY IMPLICIT DATA

CROSS-REFERENCE TO RELATED APPLICATIONS

This application is a continuation-in-part of U.S. patent application Ser. No. 14/449,431 filed on Aug. 1, 2014, which claims the benefit of U.S. Provisional Application No. 61/955,433 filed on Mar. 19, 2014. This application also claims the benefit of U.S. Provisional Application No. 61/955,433 filed on Mar. 19, 2014 and U.S. Provisional Application No. 61/971,200 filed on Mar. 27, 2014. All of the above applications are incorporated herein by reference in their entirety.

FIELD OF THE INVENTION

The present invention relates generally to wireless communication, and more specifically to high efficiency Wi-Fi transmissions.

BACKGROUND OF THE INVENTION

Prior to setting forth the background of the invention, it may be helpful to set forth definitions of certain terms that will be used hereinafter.

The term "Wi-Fi" as used herein is defined as any wireless local area network (WLAN) products that are based on the Institute of Electrical and Electronics Engineers (IEEE) 802.11 standards.

The term "Access Point" or "AP" as used herein is defined as a device that allows wireless devices (also known as User Equipment or "UE") to connect to a wired network using Wi-Fi, or related standards. The AP usually connects to a router (via a wired network) as a standalone device, but it can also be an integral component of the router itself.

The term "client" as used herein is defined as any device that has wireless communication capabilities, specifically, the IEEE 802.11 standards. A client may be for example a smart telephone, a laptop, a tablet or a personal computer (PC).

The notation "STA" as used herein is defined in as an IEEE 802.11 client.

The term "BSS" is an acronym for Basic Service Set, which is typically a cluster of stations supported by an AP.

The term "node" as used herein is defined as general name for both IEEE 802.11 AP and IEEE 802.11 STA.

The term "serving AP" as used herein is defined in relation to one AP and one STA, wherein the STA is registered to the AP, and the AP and STA are sending and receiving data to and from each other.

The term "neighboring APs" or "neighboring nodes" relate to two co-frequency (or co-channel) APs or nodes that are within each other's sensitivity range, e.g. at least one of them can receive the other in such an signal-to-noise ratio to allows decoding of signals.

The term "CCA range" as used herein is a range between two IEEE 802.11 nodes, wherein at least one node can receive the other's transmission at a power level equal or larger than "CCA Level" e.g. −82 dBm.

The term "CSMA/CA" stands for Carrier-Sense-Multiple-Access/Collision-Avoidance, representing a requirement to listen before transmitting in a multi-node wireless system that shares a common channel on the basis of first-come-first-served.

The term "preamble" as used herein describes a certain 802.11 transmitted signal modulation appearing at the beginning of each packet, that when received by other 802.11 nodes, will force them to yield channel access.

The notation "SINR" stands for Signal to Interference plus Noise Ratio.

The term "ACK" as used herein, stands for acknowledgement, and is defined as the signal transmitted from an IEEE 802.11 receiving node to the IEEE 802.11 node that has transmitted a packet to it, provided the packet was successfully received.

The term "time division duplex" (TDD) as used herein refers to systems using the same frequency spectrum for methods of communications in a time division manner such as Wi-Fi systems.

The term "channel sounding" or simply "sounding" is the process defined in 802.11 specifications that enables the full dimensionality of the radio channel to be determined. One sounding technique described in the 802.11 specifications is for an AP to transmit a Null Data Packet (NDP), a packet without a MAC frame.

The term "implicit channel sounding procedure" or simply "implicit sounding" is the process defined in 802.11 specifications, where both down and up links share the same spectrum. In the aforementioned process, the uplink channel estimated by the AP, is assumed to be identical to the downlink one—based on reciprocity principle—and is therefore is considered by the AP to represent the channel towards the client/STA. Specifically, an AP sends a request for a standard (known) sounding packet to the STA. In response, the STA sends the sounding packet and the AP estimates the uplink channel. The downlink channel is then assumed to be identical. As channel reciprocity is assumed, a calibration process is mandatory in implicit sounding.

The term "explicit channel sounding procedure" or simply "explicit sounding" is the process defined in 802.11 specifications where AP transmissions are channel estimated by the STA, and then fed back to the AP, providing it with the magnitude of phase and amplitude differences between the signals as transmitted by the AP vis-à-vis as received by the client/STA, allowing it to gauge or measure possible distortions and correct them.

Associated STA is defined herein as a STA that is served by a certain AP with a certain Service Set Identifier (SSID).

Non-associated STA is defined herein as a STA within the range of the non-serving AP.

The acronym "NAV" stands for Network-Allocation-Vector and represents virtual carrier sense mechanism, used by a Wi-Fi transmitting message to broadcast the predicted duration of its transmission, signaling to other nodes for how long 1 the channel be occupied.

The acronym "RTS" stands for Request-To-Send, and represents a message transmitted by one Wi-Fi node to another, probing it for information about its availability to receive data, per the Wi-Fi Alliance protocol.

The acronym "CTS" stands for Clear-To-Send, and represents a positive response from the other node to the node originating the RTS, indicating to the requesting node that the channel is clear from its point of view as well.

The notation "DURATION" is a message embedded in both RTS and CTS, representing a prediction of the future traffic about to be transmitted between two nodes that have captured the channel; other nodes that receive it, must clear the channel as long as the DURATION has not expired; other nodes that have received the RTS but received the CTS (hidden nodes) will avoid accessing the channel, allowing the receiving node to successfully complete the reception.

The acronym "FLA" stands for Fast Link Adaptation, and represents processes that reduce transmitting side learning time of the receiver's SINR.

The acronym "MCS" stands for Modulation Coding Scheme, mapping SINR to modulation order and code rate.

The acronym "MRQ" stands for MCS request (Modulation Code Scheme Request)

The acronym "MSI" stands for MRQ Sequence Identifier, which carries MCS feedback from receiver to transmitter.

The term "null" as used herein, is a spatial pattern, created by two or more antennas, formed in such a way that significantly reduces the power level received by a given receiver (e.g., a local minimum). An "Rx Null" is a null formed by a receiver's antennas weight in order to decrease undesired signal level. A "Tx Null" is formed by transmitter's antennas weights in order to decrease its undesired transmitted signal at remote receiver's input.

The term "actual null depth" as used herein, is the estimated value of the null after a certain time period has elapse since the last explicit sounding in which the amplitude and the phase have drifted so as to yield null degradation. The actual null depth is the original null taking account the estimated null degradation.

The term "AP Beacon" is a management signal that is transmitted at regular intervals (typically about 10 times per second) that indicates capability of the AP. The Beacon frame contains both mandatory information (such as SSID) and optional data that may include vendor specific information.

NDP represents Null Data Packet, transmitted by a Beamformer Node towards a Beamformee Node.

Compressed beamforming represents a data packet transmitted by a Beamformee Node towards a Beamformer Node as a response to a NDP; it comprised of a channel estimation matrix including all combinations of N Beamformee and M beamformer antennas.

Reciprocity calibration as defined herein is a process in which two TDD Nodes exchange transmissions, perform receptions, and calculate beamforming settings, so that the channel matrix values measured between the antennas of a first node and a second node in one direction, can be modified via said calibration process so that when used in the other direction, will be perceived by the other node with the same channel matrix values.

According to current IEEE 802.11 air protocols, two APs may download traffic over the same frequency channel to their respective STAs at the same time as long as these APs are not within CCA range of each other. When an RTS/CTS procedure is used, an additional condition is introduced, namely, a legacy STA receiving the download traffic from its serving AP, must not be within CCA range of other transmitting neighboring AP or STA.

It should be noted that the notations I, J, K given in capital letters, are not related to the notations i, j, k given in lower case.

SUMMARY OF THE INVENTION

In many deployments APs sharing the same radio channel are within CCA range of each other. Thus, an AP may be blocked from transmitting to its client STA due to activity of a neighboring AP. An AP equipped with transmitting and receiving MIMO, may enhance its signal to its client STA while simultaneously nulling its signal toward the interfering AP. Gaining knowledge of the AP-AP channel may be done using AP-AP explicit sounding procedure.

However, the aforementioned method may only accommodate low mobility environments, where neighboring APs are updating each other's channel knowledge via explicit sounding in between packets or several packets, assuming drift accumulated over time elapsed from last measurement is minimal At high mobility environments the aforementioned method estimates nulling capability deterioration based on measured fading gradients, and accordingly conducts nulling capabilities qualification before deciding on accessing the neighboring AP occupied channel.

Embodiments of the present invention disclose a MU-MIMO procedure, which enables a neighboring AP to access a channel already occupied by another downloading AP, is disclosed at AP-AP explicit sounding patent.

Embodiments of the present invention may require that the APs participating will be listed (e.g. "on the list") of the AP Sounding Set (APSS), being a cluster of APs that work together with mutual sounding process to reduce interference.

Each AP performs APSS initialization by surveying the neighboring co-channel APs periodically, listing those who are within its CCA range, eliminating from the list legacy APs which do not adhere to the APSS protocol. An AP member of the APSS group may then perform a periodic APSS sounding versus all appearing on their list, or versus those that cause most of the blocking it experiences.

Additionally, the AP also performs an implicit measurement each time an explicit one is taking place, for example, it registers the complex values of uplink signals transmitted by each of the neighbor's antennas, as received by each of its receiving antennas, across the bandwidth; the implicit measurement is then compared to the explicit one, and a calibration factors per subcarrier may be derived.

Once the AP is contemplating to download a packet to a STA client while the channel is already occupied by one of its listed neighboring APs, it performs an updated implicit measurement of the neighbor, then retrieves the last stored the calibration factor; the calibration factor is also subject to updates, in order to address mobility and fading that may introduce channel variations.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

FIGS. 4 and 5 are block diagrams, illustrating dual sounding procedure, in which an AP reuses a channel occupied by another AP within CCA range in accordance with some embodiments of the present invention;

DETAILED DESCRIPTION OF THE INVENTION

Figure 1:
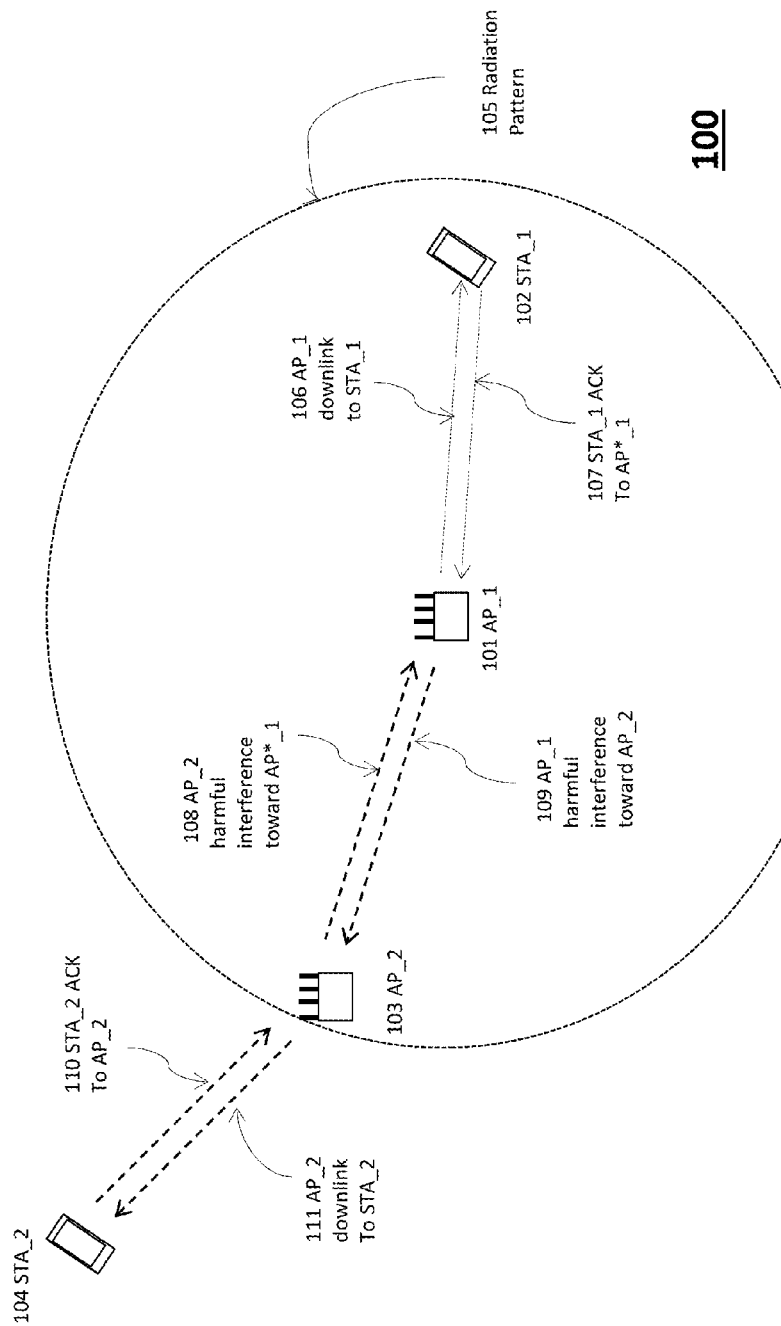
FIG. 1 is a block diagram illustrating two neighboring multi antenna access points deferring to each other when within CCA range according to the prior art.

Prior to setting forth the detailed description of the invention, it may be helpful to set forth definitions of certain terms and acronyms that will be used hereinafter in describing embodiments of the present invention.

"APSS" is an acronym for AP Sounding Set. This is a cluster of APs that works together with mutual AP-AP sounding process to reduce interference according to embodiments of the present invention. An AP may indicate that it is APSS-capable (e.g. capable in participating in a mutual sounding process) via its AP beacon signal.

"APSS-AP" indicates an AP which is compatible with APSS, meaning it is equipped with special software so that it can participate in APSS, either as a sounder or as a responder.

"APSS-AP_1" is the AP that initiates the APSS process. If multiple APSS-APs are present, then multiple APSS's exist.

"APSS_ID" is a K bit random code selected by APSS-AP_1 to identify the APSS that it has created "APSS-AP_i" is an AP member in a group of APs that is a recipient of an APSS-AP_1's initiation of an APSS process, where I {2 ... K} is the designator for the different APSS-AP that are members of the APSS_ID. Also labeled as "Compatible Access Point".

"APSS-I-AP" is an AP being an improved version of APSS-AP and capable of both APSS explicit sounding of neighboring APSS-APs as explained above, as well as implicit channel estimation carried out while a responding compressed beamforming is received by the APSS-I-AP from and APSS-AP, and using it for calibration of implicit measurements that follow when nulling of neighboring APSS-APs is performed.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention provide an improvement to a configuration of two 802.11 MU-MIMO capable neighboring access points, which perform from time to time explicit channel sounding of each other. Explicit AP-AP sounding may be carried out in a manner similar to the methodology of AP-to-STAs sounding process of 802.11ac, wherein APs sound each other via Null-Data-Package (NDP) transmissions and compressed beamforming responses. Explicit AP-AP sounding provides accurate downlink channel knowledge each time it is applied, yet the frequency of application is limited by the overhead it creates, therefore, effective nulling can be applied within few milliseconds after the sounding, as time intervals grow, the channel changes and the null depth is reduced.

Embodiments of the present invention provide a method of combining AP-AP explicit sounding with implicit sounding, thus maintaining high nulling capability even when the last sounding took place considerable amount of time earlier.

FIG. 1 illustrates access points AP_1 101 and AP_2 103 deployed within the CCA range 105 of AP_1, wherein both AP_1 and AP_2 use the same 802.11 channel in accordance with the prior art. It is assumed that the channel was occupied by yet another 802.11 node that made both AP_1 and AP_2 waiting for it to clear the channel, and that AP_2 has transmitted a Preamble slightly before AP_1 was about to transmit its Preamble, and consequently the channel was captured by AP_2, which then started serving its 104 client STA_2 with a download packet 111.

Being a co-channel Wi-Fi access point (e.g., IEEE 802.11ac), AP_1 is prohibited from accessing the channel and has to wait for the channel to clear again. It is further depicted in FIG. 1 that in a hypothetical case wherein AP_1 would have nevertheless violated the rule and proceeded to download a packet 106 to its 102 client STA_1, the immediate results of the two APs transmitting download 108, 109 packets to their respective client STAs in the illustrated apparatus, would not be harmful to the transmitters 101, 103, but would potentially jam the reception of acknowledgements 107, 110.

Figure 2:
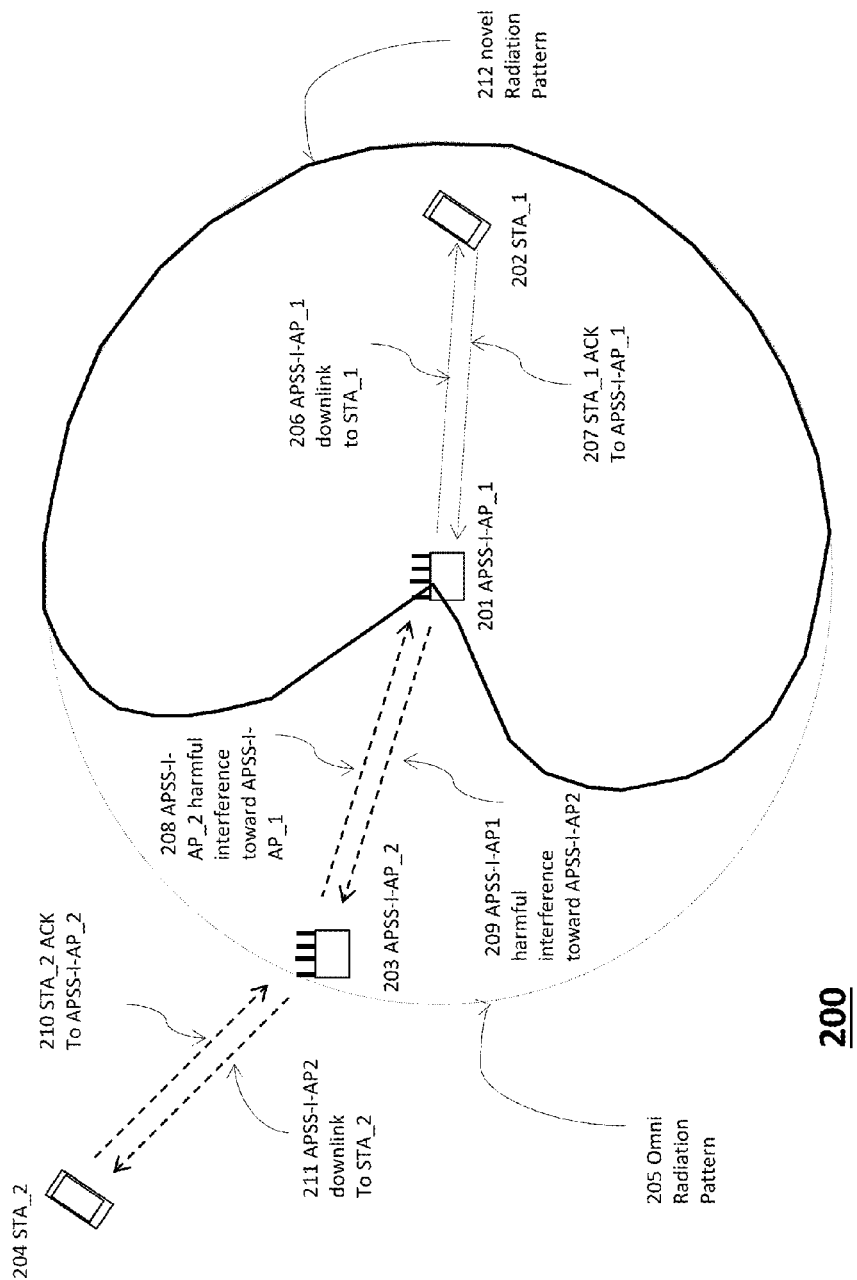
FIG. 2 is a block diagram illustrating two neighboring multi antenna access points, which may simultaneously use the same channel under certain conditions in accordance with some embodiments of the present invention.

FIG. 2 illustrates APs APSS-I-AP_1 201 and APSS-I-AP_2 203, according to embodiments of the present invention. The APSS-I-APs are similar to the APs in FIG. 1, with the difference that: APSS-I-AP_1 201 and APSS-I-AP_2 203 are provided with APSS capabilities APSS-I-APAPSS-I-AP. In essence, APSS-I-AP_1 is capable of forming such a transmit null towards one or more antennas of APSS-I-AP_2, enabling it to access the channel previously occupied by APSS-I-AP_12 without harming the proper reception of acknowledgement 210 coming from STA_2 204, under certain conditions.

While forming a transmitting null towards APSS-I-AP_2, APSS-I-AP_1 is also capable of forming a receiving null towards one or more of the interference components of APSS-I-AP_2 data streams 208, providing some level of protection for receiving acknowledgment 207 from its client STA2 under certain conditions.

Figure 3:
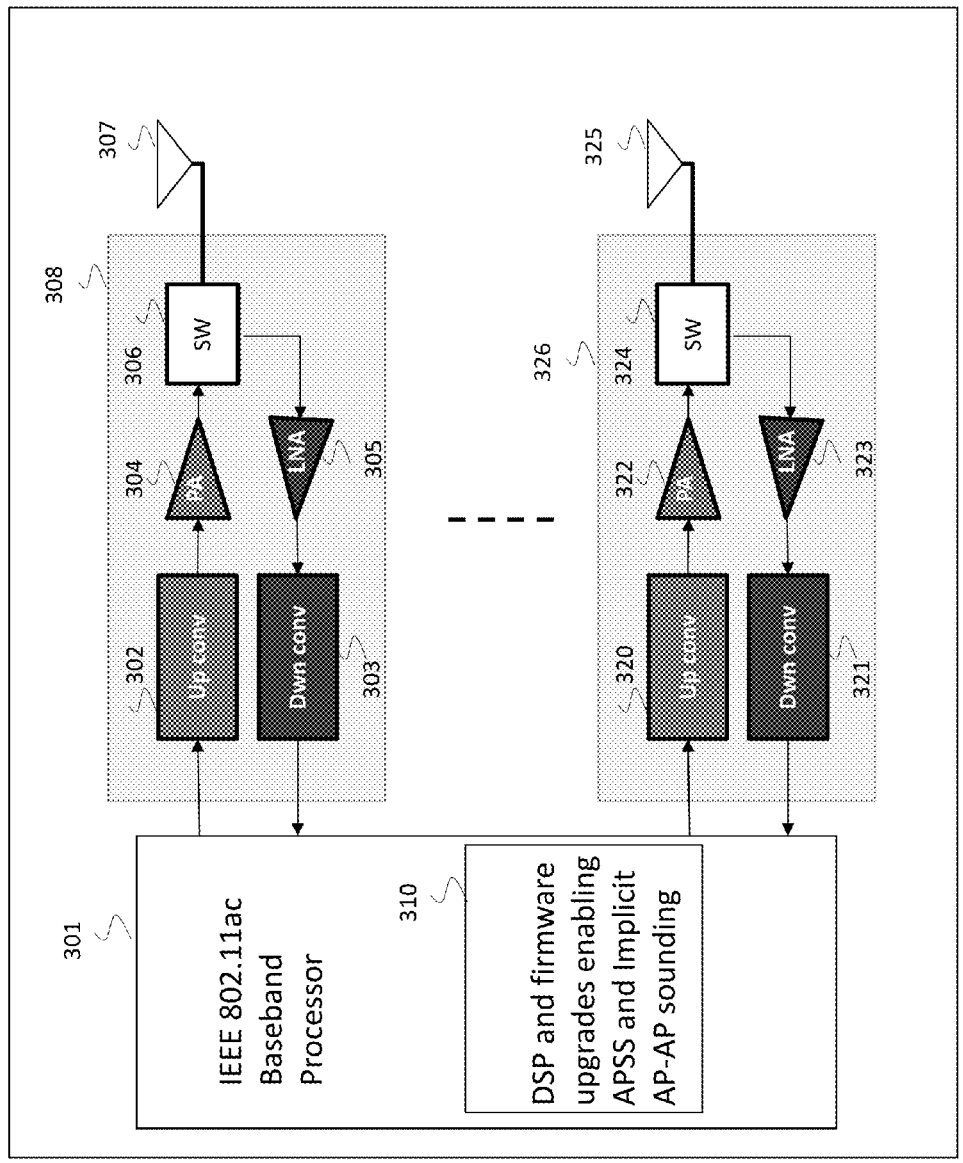
FIG. 3 is an example of an AP block diagram with firmware upgrades enabling both explicit and implicit AP to AP sounding in accordance with some embodiments of the present invention.

FIG. 3 is a block diagram 300 illustrating an exemplary high level architecture of an APSS-I-AP_1 300 according to some embodiments of the invention. APSS-I-AP_1 300 has the structure of a typical IEEE 802.11ac AP with a rank 2×2 MIMO receive/transmit configuration or higher. A first RF chain starts from an antenna 307 that feeds a plurality of radio circuits 308 configured to transmit and receive signals via the plurality of antennas (e.g. 307). Radio circuits 308 may include a switch 306, which in turn feed an LNA 305 and a down-converter 303, and being fed by a power amplifier 304 and an up-converter 302. A second RF chain, may start with antenna 325 and radio circuits 326 may include a switch 324, which in turn feeds a LNA 323 and a down-converter 321, and is fed by (e.g. receives signals from) a power amplifier 322 and an up-converter 320. Similar RF chains can be provided (not shown) all structured in a similar way with its own antennas and RF circuits.

All of the aforementioned RF chains are connected to the APSS-I-AP baseband processor 301, which may comprised of a legacy 802.11ac or higher release, capable of receiving and transmitting a 2×2 MIMO rank or higher, and is further capable of performing Multi-User MIMO (MU-MIMO) operation.

Additionally, in accordance with embodiments of the present invention, baseband processor 301 may be provided with DSP and firmware upgrades enabling APSS and Implicit AP-AP sounding. These upgrades provides the functionalities that makes access point 300 both APSS compatible and further capable in participating in mutual AP-AP implicit sounding procedure. For example, these upgrades enable baseband processor 301 to monitor signals received by radio circuits 308 and generate a list of neighboring co-channel access points, that each has plurality of antennas and are further located within a clear channel assessment (CCA) range of the access point.

FIG. 4 is a block diagram 400 illustrating potential deployment of the access points according to embodiments of the invention. Access point 401 is operating within the CCA ranges of several neighboring APSS capable access points 402, 403, and 404. In operation, AP 401 may be configured to broadcast, at time $T_i$ an NDP announcement to be received at all APSS-capable access points 402, 403, and 404. The broadcast in accordance with embodiment of the present invention differs from an NDP announcement broadcast according to the MU-MIMO IEEE 802.11ac standard in which the NDP announcement is broadcasted by an AP and may be directed at STAs that would be then the served STAs at the MU-MIMO transmission scheme. Specifically, the NDP announcement broadcast according to embodiments of the present invention is conducted by an AP and is directed at neighboring APs that are further provided with the APSS capability. The neighboring APs will not be served by the broadcasting AP but rather, the sounding procedure will provide data indicative of how to access an already occupied channel without interfering with neighboring APs serving their STAs.

FIG. 5 illustrates a system 500 according to embodiments of the invention, wherein access point APSS-I-AP_1 501 may be an AP capable of performing explicit sounding of neighboring APs as well as implicit sounding of the neighboring APs, operating within the CCA range of several neighboring APSS-capable APs, APSS-I-AP_2 502, APSS-I-AP_3 503, and APSS-I-AP_4 504. Each of neighboring APSS capable APs may be assigned with its own time slot similarly to time slots set for stations in the IEEE 802.11ac standard (e.g. $T_{i+1}$, $T_{i+2}$ and $T_{i+3}$ in which they are configured to unicast to AP 501 the compressed channel matrix holding the channel data. As in FIG. 4, the system depicted differ from IEEE 802.11ac standard in that the nodes participating in the sounding are AP both as the beamformer and beamformees. The sounding set generated following the broadcast depicted in FIG. 5 and the unicast transmission depicted in FIG. 5 is for access points only.

Figure 6:
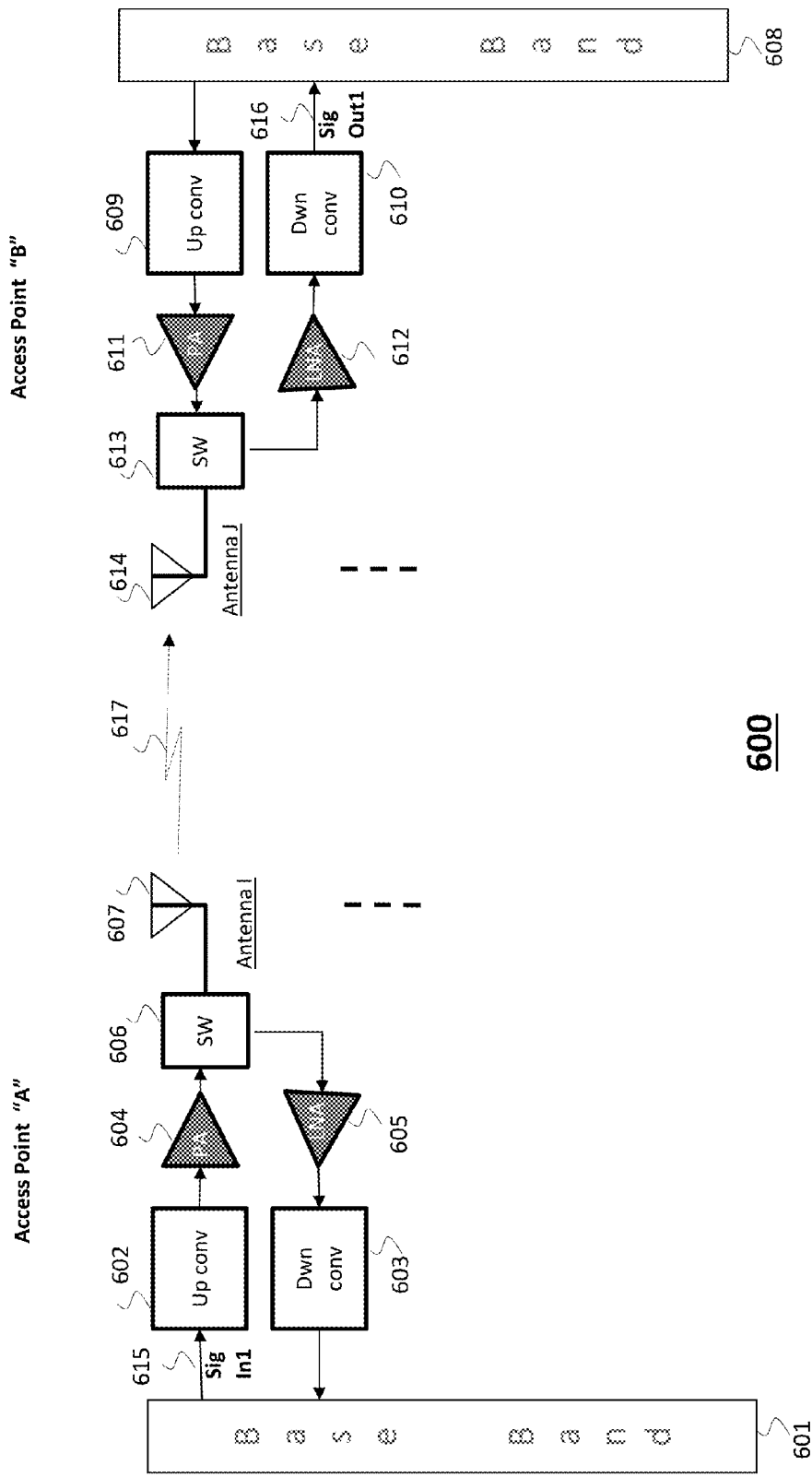
FIGS. 6 and 7 are block diagrams, illustrating various Receive and Transmit components in both Beamformer and Beamformee nodes that contribute to phase and amplitude deflections in accordance with some embodiments of the present invention.
Figure 7:
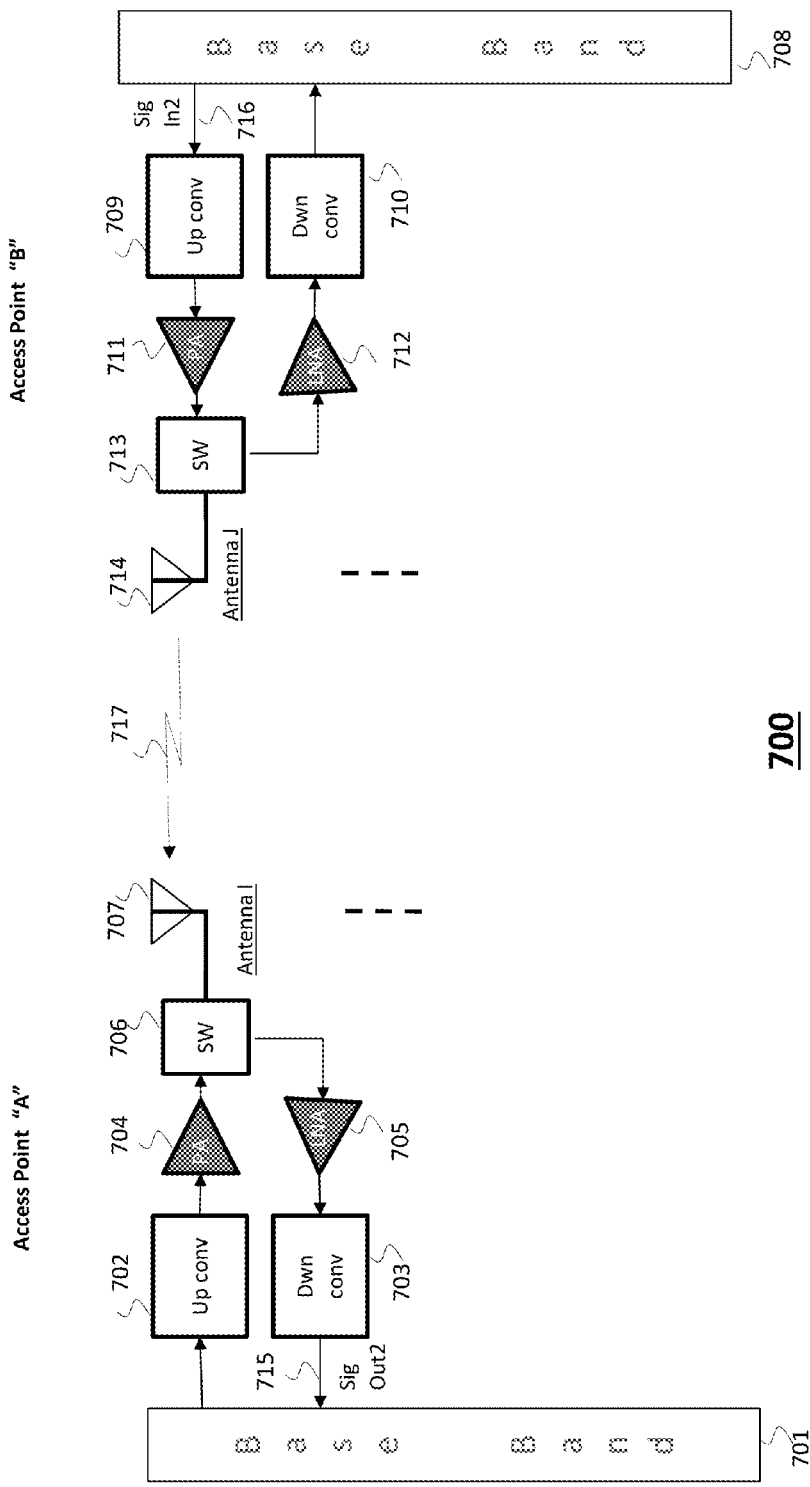

FIGS. 6 and 7 are block diagrams showing all components of in an end-to-end scheme (e.g. baseband to baseband) of two access points having a communication link between them. Specifically FIG. 6 focuses on transmission from access point A to access point B while FIG. 7 focuses on transmission from access point B to access point A. FIGS. 6 and 7 illustrate the various signal degradations, apart from the channel, that need to be taken into account in calibrating the implicit sounding measurements since the end-to-end channel from access point A to access point B and the end-to-end channel from access point B to access point A are not reciprocal.

More specifically, FIG. 6 depicts a system 600 including access points A and B. Access point A with baseband processor 601, up and down converters 602, 603, respectively, Power Amplifier and Low Noise Amplifier 604, 605, respectively, an RF switch 606 that select either transmission or reception through the common antenna 607. Access Point B includes baseband processor 608, up and down converters 609, 610, respectively, Power Amplifier and Low Noise Amplifier 611, 612, respectively, an RF switch 613 that selects transmission or reception thru the common antenna 614.

Access Point A $SigIn_1$ signal 615 from baseband processor 601, which is passed through the RF chain 602, 604, 606, 607, propagates through the channel 617, received by the RF chain 614, 613, 612, 610 of Access Point B and fed to baseband processor 608 as $SigOut_1$ 616.

FIG. 7 depicts system 700 including access points A and B. Access point A with baseband processor 701, up and down converters 702, 703, respectively, power amplifier and Low Noise Amplifier 704, 705, respectively, an RF switch 706 that select either transmission or reception thru the common antenna 707. Access point B includes baseband processor 708, up and down converters 709, 710, respectively, power amplifier and Low Noise Amplifier 711, 712, respectively, an RF switch 713 that select either transmission or reception through the common antenna 714. Access point B $SigIn_2$ signal 716 from baseband 708, which is passed through the RF chain 709, 711, 713, 714, propagates thru the channel 717, received by the RF chain 707, 706, 705, 703 of Access Point A and fed to baseband processor 701 as $SigOut_2$ 715.

According to embodiments of the invention, Access point A may be configured to compare the Null-Data-Package transmitted as $SigIn_1$ with the response received as $SigOut_2$, so that access point A can thus estimate and eliminate Rx/Tx circuitry distortions in both sides (e.g. from A to B and from B to A).

In order to mathematically formulate a solution for estimating the Rx/Tx circuitry distortions on both sides, we may start in calculating the $SigOut_1$ 616 as a function of $SigIn_1$ 615 at time T. As derived from FIG. 6, $SigOut_i$ 616 may be given in Eq. 1 below as being affected by various factors (FACT) as follows:

$$Sig_{out1}(freq_k, Chan_J) = FACT_{upconv}(A, freq_k, Chan_I) \cdot FACT_{PA}(A, freq_k, Chan_I) \cdot FACT_{SWT}(A, freq_k, Chan_I) \cdot FACT_{Ant}(A, freq_k, Chan_I) \cdot FACT_{propag}(T, I, J, freq_k) \cdot FACT_{Ant}(B, freq_k, Chan_J) \cdot FACT_{SWR}(B, freq_k, Chan_J) \cdot FACT_{LNA}(B, freq_k, Chan_J) \cdot FACT_{dwnconv}(B, freq_k, Chan_J) \cdot Sig_{in1}(freq_k, Chan_I) \quad \text{Eq. 1}$$

Where:
$FACT_{upconv}(A, freq_k, Chan_I)$ denotes the signal distortion of the up convertor in channel "I" in AP "A" at freq "k";
$FACT_{dwnconv}(B, freq_k, Chan_J)$ denotes the signal distortion of down convertor in channel "J" in AP "B" at freq "k";
$FACT_{PA}(A, freq_k, Chan_I)$ denotes the signal distortion of PA in channel "I" in AP "A" at freq "k";
$FACT_{LNA}(B, freq_k, Chan_J)$ denotes the signal distortion of LNA in channel "J" in AP "B" at freq "k";
$FACT_{SWT}(A, freq_k, Chan_I)$ denotes the signal distortion of SW in TX path in channel "I" in AP "A" at freq "k";
$FACT_{SWR}(B, freq_k, Chan_J)$ denotes the signal distortion of SW in RX path in channel "J" in AP "B" at freq "k";
$FACT_{Ant}(A, freq_k, Chan_I)$ denotes the signal distortion of antenna "I" in AP "A" at freq "k";
$FACT_{Ant}(B, freq_k, Chan_J)$ denotes the signal distortion of antenna "J" in AP "B" at freq "k";
$FACT_{propag}(T, I, J, freq_k)$ denotes the distortion due to propagation between channel "I" and channel "J" in freq "k" at time T;

Similarly, as may be derived from FIG. 7, $SigOut_2$ 715 as a function of $SigIn_2$ 716 at time T may be given in Eq. 2 below:

$$Sig_{out2}(freq_k, Chan_I) = FACT_{upconv}(B, freq_k, Chan_J) \cdot FACT_{PA}(B, freq_k, Chan_J) \cdot FACT_{SWT}(B, freq_k, Chan_J) \cdot FACT_{Ant}(B, freq_k, Chan_J) \cdot FACT_{propag}(T, I, J, freq_k) \cdot FACT_{Ant}(A, freq_k, Chan_I) \cdot FACT_{SWR}(A, freq_k, Chan_I) \cdot FACT_{LNA}(A, freq_k, Chan_I) \cdot FACT_{dwnconv}(A, freq_k, Chan_I) \cdot Sig_{in2}(freq_k, Chan_J) \quad \text{Eq. 2}$$

Where:
$FACT_{upconv}(B, freq_k, Chan_J)$ is the signal distortion of up convertor in channel "J" in AP "B" at freq "k";
$FACT_{dwnconv}(A, freq_k, Chan_I)$ is the signal distortion of down convertor in channel "I" in AP "A" at freq "k";
$FACT_{PA}(B, freq_k, Chan_J)$ is the signal distortion of PA in channel "J" in AP "B" at freq "k";
$FACT_{LNA}(A, freq_k, Chan_I)$ is the signal distortion of LNA in channel "I" in AP "A" at freq "k";
$FACT_{SWT}(B, freq_k, Chan_J)$ is the signal distortion of SW in TX path in channel "J" in AP "B" at freq "k";
$FACT_{SWR}(A, freq_k, Chan_I)$ is the signal distortion of SW in RX path in channel "I" in AP "A" at freq "k";
$FACT_{Ant}(B, freq_k, Chan_J)$ is the signal distortion of antenna "J" in AP "B" at freq "k";
$FACT_{Ant}(A, freq_k, Chan_I)$ is the signal distortion of antenna "I" in AP "A" at freq "k"; and
$FACT_{propag}(T, I, J, freq_k)$ denotes the distortion due to propagation between channel "I" and channel "J" in freq "k" at time T same as in the other direction (for the same time)

As explained above, in addition to explicit sounding, the APSS-I-AP may also performs an implicit measurement each time an explicit one is taking place, e.g., the APSS-I-AP registers the complex values of uplink signals transmitted by each of the neighbor's antennas, as received by each of its receiving antennas, across the bandwidth. The implicit measurement is then compared to the explicit one, and a calibration factors per subcarrier may be derived.

Once the APSS-I-AP is contemplating to download a packet to a STA client while the channel is already occupied by one of its neighboring APSS-I-AP (which is on its APSS list), it performs an updated implicit measurement of the neighbor (without an explicit sounding), then retrieves the last stored calibration factor, followed by a correction based on $1^{st}$ order, or $2^{nd}$ order or $3^{rd}$ order extrapolation, depending on the fading environment.

In FIG. 6, whenever AP "A" sends "B" an explicit calibration signal "NDP" this signal is a priori well known to both side, so that AP "B" can calculate the total end-to-end distortion as follows:

$$\text{Distortion}(T_1, A_I, B_J, freq_k) = \frac{Sig_{out1}(freq_k, Chan_J)}{Sig_{in1}(freq_k, Chan_I)}$$

$$\text{Distortion}(T_1, A_I, B_J, freq_k) = FACT_{upconv}(A, freq_k, Chan_I) \cdot FACT_{PA}(A, freq_k, Chan_I) \cdot FACT_{SWT}(A, freq_k, Chan_I) \cdot FACT_{Ant}(A, freq_k, Chan_I) \cdot FACT_{propag}(T_1, I, J, freq_k) \cdot FACT_{Ant}(B, freq_k, Chan_J) \cdot FACT_{SWR}(B, freq_k, Chan_J) \cdot FACT_{LNA}(B, freq_k, Chan_J) \cdot FACT_{dwnconv}(B, freq_k, Chan_J) \quad \text{Eq. 3}$$

Where $T_1$ is the measurement taken at time $T_1$.

This comprehensive end-to-end data is sent back as a reply to AP "A" in reduced (e.g. compressed) form so that AP "A" can expand the NDP message and know the end-to-end distortion that is accurate for the time the measurement is made (time of the calibration message) after some time due to change in propagation condition the distortion value is inaccurate, therefore the distortion value is valid only after a short interval after the calibration message is sent.

In order to maintain good nulling condition frequent explicit calibration message may be applied. However, frequent explicit sounding is not practical since neighboring APs may be polled only when they are neither transmitting nor receiving data to or from their own client STAs, and so explicit sounding of them may be done only sporadically, at idle moments.

In implicit sounding, AP "A" receives an opportunistic transmission from "B" not necessarily intended to it, all transmissions include a training interval where the transmit signal and antenna is well known to all side (protocol dependent), from this training interval AP "A" may derive the overall channel distortion from "B" to "A" as formulated below:

$$\text{Distortion}(T_2, B_J, A_I, freq_k) = \frac{Sig_{out2}(freq_k, Chan_I)}{Sig_{in2}(freq_k, Chan_J)}$$

$$\text{Distortion}(T_2, B_J, A_I, freq_k) = FACT_{upconv}(B, freq_k, Chan_J) \cdot FACT_{PA}(B, freq_k, Chan_J) \cdot FACT_{SWT}(B, freq_k, Chan_J) \cdot FACT_{Ant}(B, freq_k, Chan_J) \cdot FACT_{propag}(T_2, I, J, freq_k) \cdot FACT_{Ant}(A, freq_k, Chan_I) \cdot FACT_{SWR}(A, freq_k, Chan_I) \cdot FACT_{LNA}(A, freq_k, Chan_I) \cdot FACT_{dwnconv}(A, freq_k, Chan_I) \quad \text{Eq. 4}$$

Where $T_2$ is the measurement time $T_2$.

This information is also generated from the reply message of B to A during the explicit calibration at time T, e.g. Distortion($T_1$, $B_J$, $A_I$, $freq_k$). Then by dividing eq 3 by 4 for time $T_1$ may be derived using equation 1 and 2:

$$\text{Ratio } (T_1, A_I, B_J, \text{freq}_k) = \frac{\text{Distortion } (T_1, A_I, B_J, \text{freq}_k)}{\text{Distortion } (T_1, B_J, A_I, \text{freq}_k)} \quad \text{Eq. 5}$$

$$\begin{aligned}\text{Ratio}(T_1,A_I,B_J,\text{freq}_k) = & \{\text{FACT}_{upconv}(B,\text{freq}_k,\text{Chan}_J) \cdot \\ & \text{FACT}_{PA}(B,\text{freq}_k,\text{Chan}_J) \cdot \text{FACT}_{SWT}(B,\text{freq}_k, \\ & \text{Chan}_J) \cdot \text{FACT}_{SWR}(A,\text{freq}_k,\text{Chan}_I) \cdot \text{FACT}_{LNA}(A, \\ & \text{freq}_k,\text{Chan}_I) \cdot \text{FACT}_{dwnconv}(A,\text{freq}_k,\text{Chan}_I)\}/ \\ & \{\text{FACT}_{upconv}(B,\text{freq}_k,\text{Chan}_J) \cdot \text{FACT}_{PA}(B,\text{freq}_k, \\ & \text{Chan}_J) \cdot \text{FACT}_{SWT}(B,\text{freq}_k,\text{Chan}_J) \cdot \text{FACT}_{SWR}(A, \\ & \text{freq}_k,\text{Chan}_I) \cdot \text{FACT}_{LNA}(A,\text{freq}_k,\text{Chan}_I) \cdot \\ & \text{FACT}_{dwnconv}(A,\text{freq}_k,\text{Chan}_I)\} \quad \text{Eq. 6}\end{aligned}$$

As can be seen from Eq. 6, the fast moving factor $\text{FACT}_{propag}(I,J,\text{freq}_k)$ may be reduced as well as the antennas factor, so that this ratio is quasi-static, e.g. slowly independent of time.

Embodiments of the present invention provide a manner by which transmissions from AP "B" that can be used by AP "A" to generate the B to A distortion at time $T_2$, $T_3$ etc. For example at time $T_n$:

$$\text{Distortion } (T_n, B_J, A_I, \text{freq}_k) = \frac{\text{Sig}_{out2}(\text{freq}_k, \text{Chan}_I)}{\text{Sig}_{in2}(\text{freq}_k, \text{Chan}_I)}$$

Following the above calculation, the opposite overall distortion due to electronic circuits from A to B may also be estimated and thus eliminated, thereby allowing the use of implicit sounding sue to the calibration process depicted above.

Figure 8:
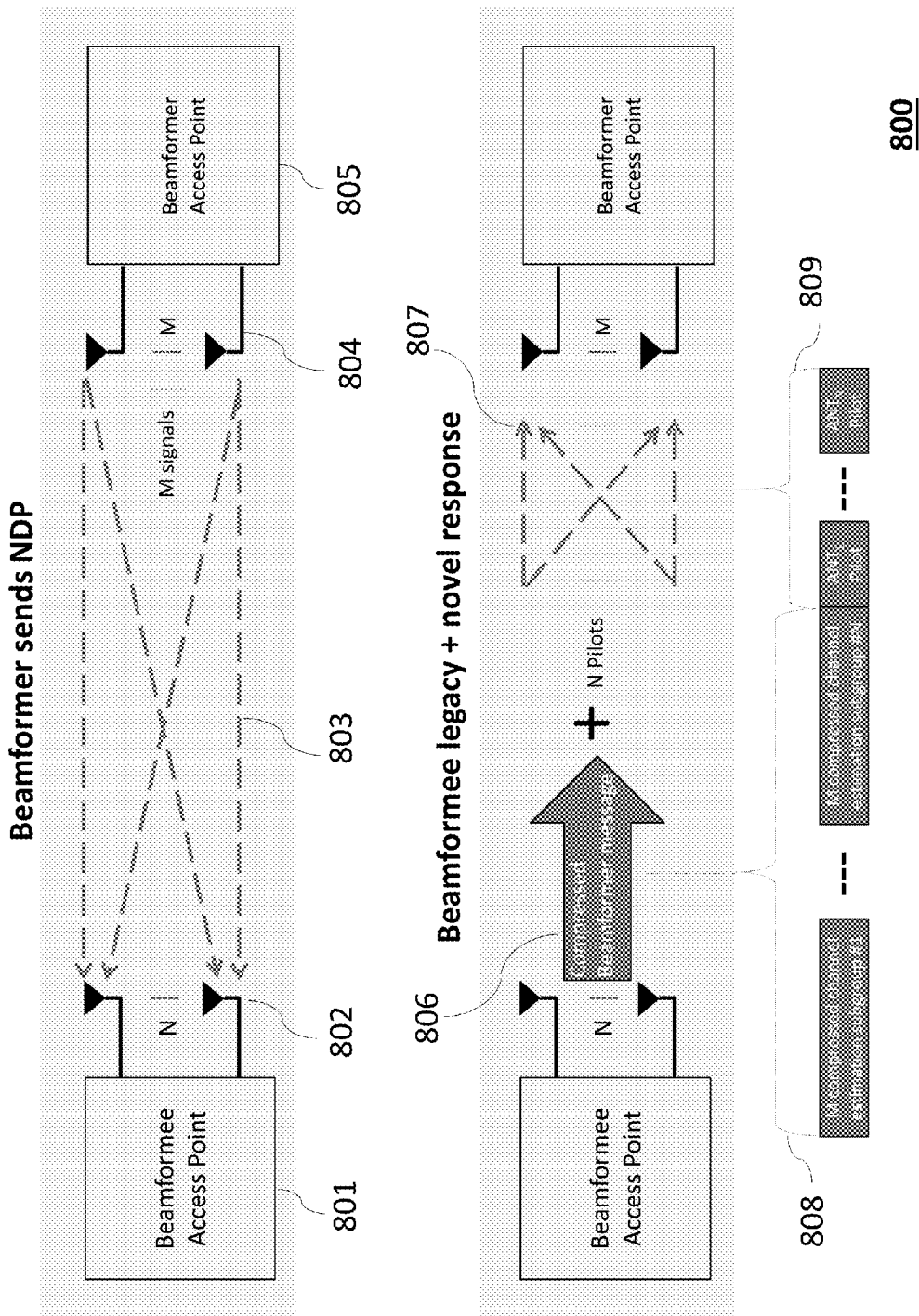
FIG. 8 depicts a novel Explicit-Implicit sounding procedure in accordance with some embodiments of the present invention.

FIG. 8 is a block diagram 800 illustrating a system and a flow combining explicit and implicit soundings in accordance with embodiments of the present invention. A beamformer access point APSS-I-AP 805 may broadcast an NDP announcement followed by an NDP to listed neighboring access points APSS-I-AP, including beamformer access point 801. The NDP may be transmitted from M antennas 804, over the channel 803, received through N antennas 802, and fed into access point APSS-I-AP 805 and its baseband.

As a results, the baseband processor of access point APSS-I-AP 801, which is configured to respond to such sounding, sends back a compressed beamformer message 806, and appends to that message a set of N pilots 807, each transmitted from a different one of the N antennas.

In some embodiments of the invention, the compressed beamforming message may be arranged in a N×M block, having N subgroups, each for one of the beamformee antennas, and the subgroups may each have M data entities, one for each of the M beamformer antennas. In some embodiments of the invention, the N pilots may be constructed of N pairs of symbols, each pair transmitted from a different beamformee antenna of the N antennas.

Figure 9:
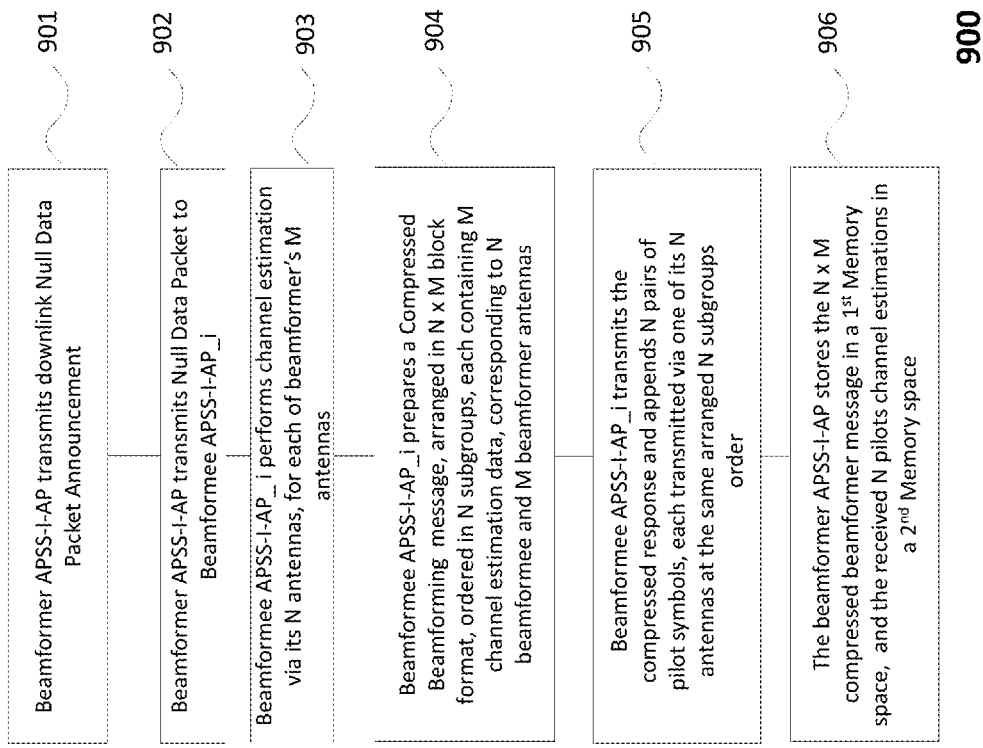
FIG. 9 is a flowchart diagram illustrating polling of explicit and implicit information by one AP from another, in accordance with some embodiments of the present invention.

FIG. 9 is a flowchart 900 illustrating an exemplary sequence of explicit and implicit information retrieval in accordance with embodiments of the invention. Illustrated in the flowchart is an explicit sounding between APSS-I-APs, carried out from time to time or periodically, with augmentation of implicit sounding. The sounding process of a beamformer APSS-I-AP may be conducted vis-à-vis a chosen set of neighboring APSS-I-APs, which may be APs within CCA range of the first APSS-I-AP configured to operate according to the present invention. The process starts at step 901 when beamformer APSS-I-AP transmits downlink Null Data Packet (NDP) Announcement. Then, in step 902, beamformer APSS-I-AP transmits Null Data Packet to beamformee APSS-I-AP_i. In step 903, beamformee APSS-I-AP_i performs channel estimation via its N antennas, for each of beamformer's M antennas. In step 904, beamformee APSS-I-AP_i prepares a compressed beamforming message, arranged in N×M block format, ordered in N subgroups, each containing M channel estimation data, corresponding to N beamformee and M beamformer antennas. In step 905, beamformee APSS-I-AP_i transmits the compressed response and appends N pairs of pilot symbols, each transmitted via one of its N antennas at the same arranged N subgroups order. Then, in step 906, the beamformer APSS-I-AP stores the N×M compressed beamformer message in a first memory space, and the received N pilots channel estimations in a second memory space. A mapping between explicit and implicit signatures enables the generation of calibration lookup table, that allows corrections of implicit measurements carried out just before nulling, as described herein. The Implicit-Explicit mapping may be carried out in step 906 by using beamformer APSS-I-AP baseband to store explicit data in a first memory space, and Implicit data in a second memory space, at a predefined arranged order.

Figure 10:
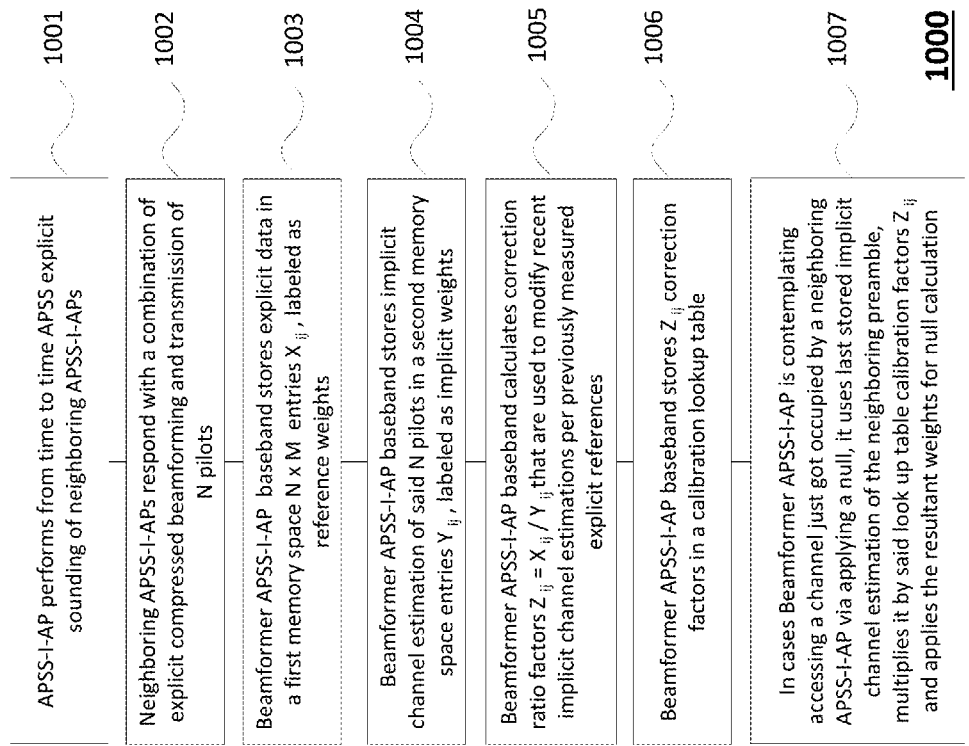
FIG. 10 depicts calibration process of implicit measurement by an explicit sounding data, in accordance with some embodiments of the present invention.

FIG. 10 is a flowchart 1000 illustrating the method in accordance with embodiments of the present invention of using explicit data to calibrate implicit channel estimation measurements. In step 1001, APSS-I-AP performs from time to time APSS explicit sounding of one or more neighboring APSS-I-APs. According to embodiments of the invention, in the sounding routine, APSS-I-AP may perform explicit sounding versus listed neighboring APSS-I-APs. In step 1002, neighboring APSS-I-APs respond with a combination of explicit compressed beamforming and transmission of N pilots. In step 1003, the baseband processor of beamformer APSS-I-AP stores explicit data in a first memory space using N×M entries $X_{ij}$, labeled as reference weights. Indices i, j, range from 1 to N and from 1 to M, respectively, which are received by the beamformer APSS-I-AP and stored in a first memory space and further referred to as reference data. In step 1004, beamformer APSS-I-AP baseband stores implicit channel estimation of the N pilots in a second memory space entries Y, labeled as implicit weights, where i, j, range from 1 to N and from 1 to M, respectively and are stored in a second memory space. In step 1005, the baseband processor of beamformer APSS-I-AP calculates correction ratio factors $Z=X_{ij}/Y_{ij}$ that are used to modify recent implicit channel estimations according to previously measured explicit references. In step 1006, the baseband processor of beamformer APSS-I-AP stores $Z_{ij}$ correction factors in a calibration lookup table. In step 1007, in the event beamformer APSS-I-AP is contemplating accessing a channel has recently been occupied by a neighboring APSS-I-AP via applying a null, it uses the last stored implicit channel estimation of the neighboring preamble, multiplies it by the look up table calibration factors $Z_{ij}$ and applies the resultant weights for null calculation.

In other words, whenever an APSS-I-AP attempting to access a previously occupied channel by a neighboring APSS-I-AP via nulling, an implicit channel estimation of the neighboring APSS-I-AP is performed to yield a measurement, and the last registered calibration factors $Z_{ij}$ is used to correct the measurement.

Figure 11:
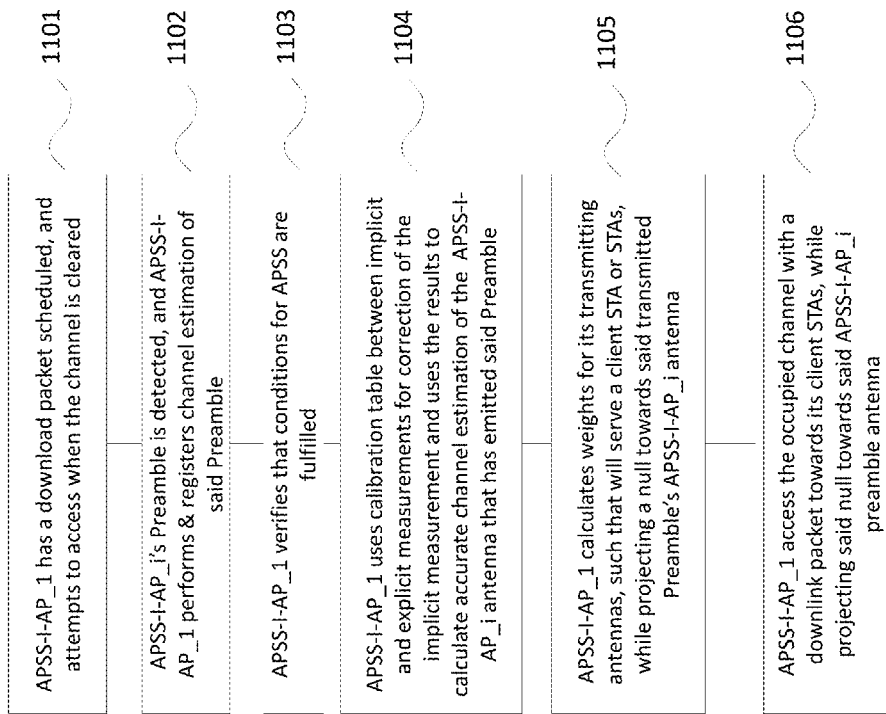
FIG. 11 is a flowchart diagram illustrating a method of using Explicit-Implicit sounding procedure between 2 APs in order to share the channel (under certain conditions) in accordance with some embodiments of the present invention.

FIG. 11 is a flowchart 1100 illustrating the way the explicit-implicit calibration may be used by a APSS-I-AP_1 for accessing of a channel just captured by one neighboring APSS-I-AP_i. In step 1101 APSS-I-AP_1 has a download packet scheduled, and attempts to access when the channel is cleared. In other words, APSS-I-AP_1 intends to download a packet scheduled to a client STA, or multiple clients STAs (in case of APSS-I-AP_1 MU-MIMO transmission). In step 1102 APSS-I-AP_i's preamble is detected, and APSS-I-

AP_1 performs and registers channel estimation of the preamble. More specifically, the interception of a preamble and an indication of preamble antenna from a neighboring APSS-I-AP_i, and the performance of the preamble channel estimation by APSS-I-AP_1 are illustrated. In step 1103 APSS-I-AP_1 verifies that conditions for APSS are fulfilled. The set of topologic conditions and qualifications that are verified before an APSS_AP_1 may perform an APSS process and access the busy channel: The beamformer AP is outside the CCA range of the STA currently served by the beamformee AP; The beamformee AP is outside the CCA range of the STA to be served by the beamformer AP; Both served STAs are verified to be located closer than the edge of their serving cells, since their corresponding APSS-AP's' sensitivity is slightly reduced by minor residual interference caused by the APSS process. In order to guarantee the APSS-AP_i session is not harmed by the APSS_AP_1 access, a null depth verification and validation is required.

In step 1104 APSS-I-AP_1 uses calibration table between implicit and explicit measurements for correction of the implicit measurement, and uses the results to calculate accurate channel estimation of the APSS-I-AP_i antenna that has emitted the preamble In step 1105 APSS-I-AP_1 calculates weights for its transmitting antennas, which will serve a client STA or STAs, while projecting a null towards the transmitted Preamble's APSS-I-AP-i antenna, and in step 1106 APSS-I-AP_1 accesses the occupied channel with a downlink packet towards its client STAs, while projecting the null towards the APSS-I-AP_i preamble antenna. Thus, the corrected Preamble channel estimation is used by APSS-I-AP_1, to create a transmit null towards the APSS-I-AP_i, while simultaneously serving its client STA or STAs with downlink packets.

It is noted that while explicit sounding provides highly accurate channel estimation right after it is performed (e.g., few milli-seconds), it can be done only on a sparse or an infrequent basis as by nature it slightly penalizing the bandwidth of the participating APs, thus null quality is gradually compromised as time goes by, until the next explicit sounding takes place.

On the other hand, implicit sounding is done in great time proximity to the application of a null (e.g., few milli-seconds), however, its accuracy is assumed lower than explicit sounding, since it relies of self-calibrated up/down channel reciprocity.

Therefore, combining explicit and implicit, facilitates getting the best of both worlds, granting close to immediate channel estimation implicit measurements the high accuracy achieved by sparse explicit channel estimation, thus reducing bandwidth exploitation penalty to a minimum.

In accordance of embodiments of the present invention the aforementioned method may include for example: transmitting and receiving signals via a plurality of M antennas and a plurality of radio circuits; monitoring the signals received by the radio circuits and generating a list of neighboring co-channel access points, that each has plurality of N antennas and are further located within a clear channel assessment (CCA) range of the access point; instructing the radio circuits to transmit a beamformer sounding to the neighboring access points which are on the list, according to a multi-user MIMO air-protocol, and receive from the beamformee access points Channel State Information (CSI) that provides explicit channel estimations information, and carrying out implicit channel estimations procedure via beamformee's additional pilot transmissions appended to the explicit compressed beamforming data.

According to some embodiments of the present invention, the sounding may be based on IEEE802.11ac air-protocol, wherein beamformee nodes of the IEEE802.11ac air-protocol or of later releases, are the neighboring access points instead of STAs, wherein compressed beamforming message according to the IEEE802.11ac air-protocol or of a later release which the beamformee access points transmit back to the beamformer access point, is arranged in a N×M blocks format, in or at an order that is known to the receiving beamformer, and wherein the beamformee access points are configured to transmit N pilots, following a transmission of the compressed-beamforming in an order that enables the beamformer to map explicit data to implicit measurements.

According to some embodiments of the present invention, the explicit compressed beamforming message sent by the beamformee, is ordered in N subgroups, each containing M channel estimation data corresponding to N beamformee and M beamformer antennas, and the implicit channel estimation is acquired by the beamformer access point via the beamformee N pilots, each transmitted through a different one of its N antennas, at a same known order in which the compressed beamforming N×M blocks were transmitted, so that the beamformer access point may map a given $N_i$ received pilot to a $N_i$ reported subgroup of the Compressed Beamforming message. According to some embodiments of the present invention, the beamformer access point is further configured to store the compressed beamforming data in a first N×M memory space residing in the baseband processor and labeled as reference measurements, and further configured to receive the N pilots with each of the M antennas, and store them in a second N×M memory space residing in the baseband processor, and referenced as implicit measurements, and wherein each entry $X_{ij}$ of the first N×M memory space is mapped to each entry $Y_1$ of the second N×M memory space, based on the known order of transmission.

According to some embodiments of the present invention, the procedure of explicit and implicit sounding processes are performed from time to time and implicit-only sounding is performed before applying a null from one access point to another.

According to some embodiments of the present invention, each entry $Y_1$ is compared to the corresponding entry $X_{ij}$ and a calibration factor $Z_{ij}$ is calculated so that $Z_{ij}=Y_1/X_{ij}$.

According to some embodiments of the present invention, a set of: $X_{ij}$, $Y_{ij}$, and $Z_{ij}$ is stored as a calibration lookup table and wherein implicit sounding measurements $Y_1$ which are carried out without explicit sounding, are corrected by $Z_{ij}$ factor, before applying nulling weighs calculations.

According to some embodiments of the present invention, the access point may be further configured to access a channel recently being occupied by a downloading listed neighboring access point, via performing channel estimation of the neighboring access point transmission, and applying a receive and a transmit null towards the neighboring access point, wherein the null weights are calculated using the implicit channel estimation, corrected by last stored calibration values $Z_{ij}$.

The According to some embodiments of the present invention, the nulling calculated for the neighboring access point that has recently occupied the channel is performed on the neighboring access point antenna which has just transmitted the Preamble received by the access point.

According to some embodiments of the present invention, the baseband may be configured to keep records of previous explicit and implicit sounding processes done per each neighboring access point, and to calculate average differences between consecutive explicit reports, as well as average differences between their corresponding implicit channel estimations.

According to some embodiments of the present invention, the variations' averages, as well as a predicted gradient signs, are considered, as well as the time elapsing between two consecutive explicit sounding taking place amongst the access point and each of it listed neighboring access points, in order to calculate a $1^{st}$ order correction.

According to some embodiments of the present invention, before using the calibration lookup table reference values Z the access point uses the parameters to calculate a $1^{st}$ order correction factor $U_{ij}$, to the $Z_{ij}$ values, so that $Z_{ij}^{(\cdot)}=Z_{ij}*U_{ij}$ is used to correct the implicit channel estimation.

According to some embodiments of the present invention, the history of Explicit Sounding is used to gauge or measure channel variation rate, via calculation of average or standard deviation or higher moments of the channel estimation data, and setting thresholds that categorize the mobility level of the access point due to STAs, or objects and people in their area of coverage.

Figure 12:
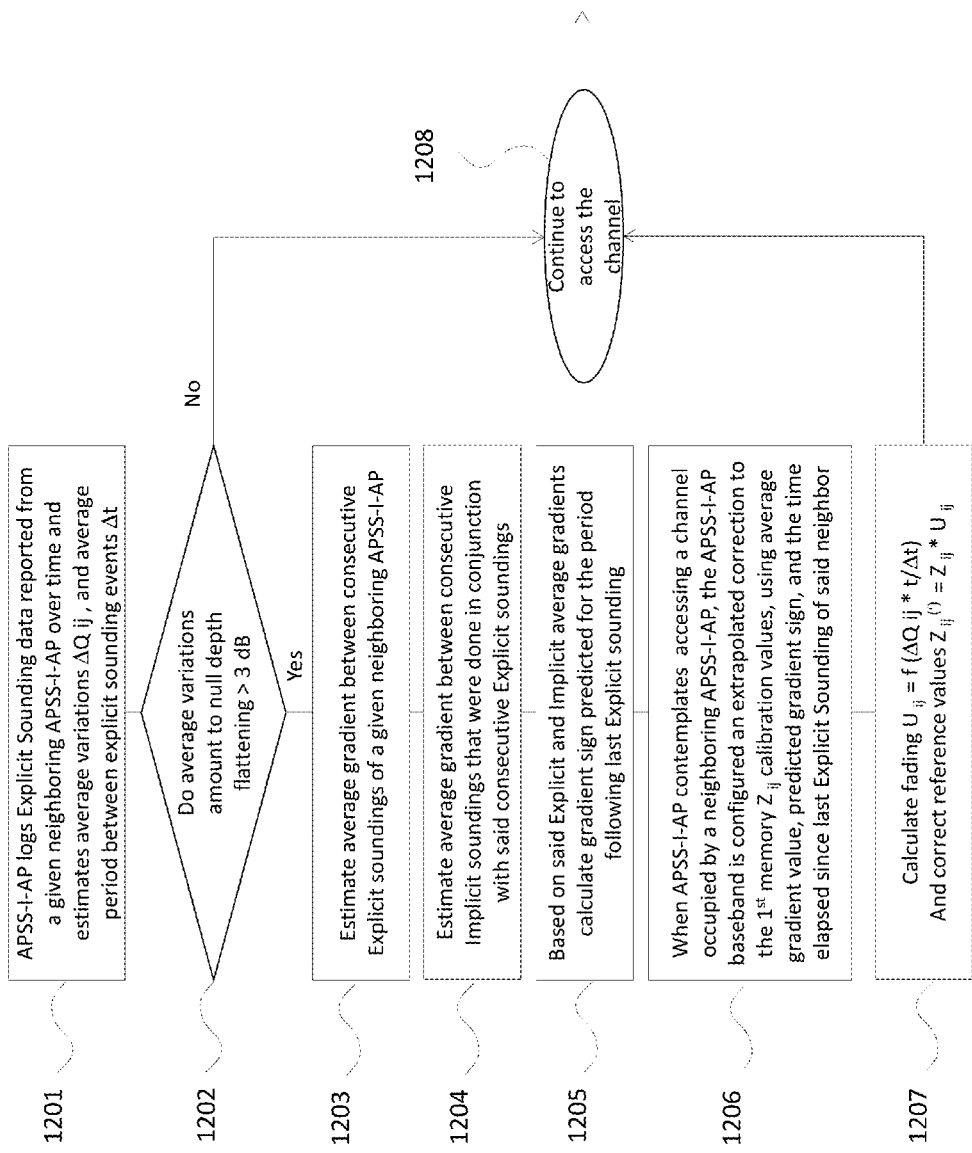
FIG. 12 depicts a method of addressing mobility and fading channel variation, in accordance with some embodiments of the present invention.

FIG. 12 is a flowchart 1200 illustrating a process that estimates channel variation over time and applies required correction to the references used for implicit channel estimation calibration; it is done by a novel method where history of Explicit Sounding is used to gauge or measure channel variation rate via observation of the previous sounding, and the calculation of average or standard deviation or higher moments of the channel estimation data, and setting thresholds that categorize the mobility level of the access point due to STAs, or objects and people in their area of coverage. In step 1201 APSS-I-AP logs Explicit Sounding data reported from a given neighboring APSS-I-AP over time and estimates average variations $\Delta Q$ ij, and average period between explicit sounding events $\Delta t$. This step depicts one embodiment of quantifying explicit sounding history of cannel variation, done by estimating changes in the $X_{ij}$ consecutive measurements and denoting them as $\Delta Q$ ij=$X_{ij}$ ($t_q-t_{q-1}$) In step 1202 the average variations amount to null depth flattening is checked to be greater than 3 dB.

In other words it depicts a metric where the total impact of all $\Delta Q$ ij may cause inaccurate setting of a desired null that would reduce its depth by 3 dB or more. If such a null depth flattening is calculated, in step 1203 the average gradient between consecutive explicit soundings of a given neighboring APSS-I-AP is estimated and in step 1204 the average gradient between consecutive implicit soundings that were done in conjunction with the consecutive explicit soundings is estimated. Specifically, gradients calculation of both explicit and implicit previous readings, may be used to correct the $Z_{ij}$ references. In step 1205 gradient sign predicted for the period following last explicit sounding is calculated based on the explicit and implicit average gradients. Additionally, the history may be also used to predict the sign of the gradient. In step 1206, when APSS-I-AP contemplates accessing a channel occupied by a neighboring APSS-I-AP, the APSS-I-AP baseband may be configured to carry out an extrapolated correction to the $1^{st}$ memory $Z_{ij}$ calibration values, using average gradient value, predicted gradient sign, and the time elapsed since last explicit sounding of the neighbor. In step 1207 fading $U_{ij}$=f ($\Delta Q$ ij*t/$\Delta t$) is being calculated and reference values $Z_{ij}^{(\cdot)}=Z_{ij}*U_{ij}$ may be corrected. The formula used for a correction factor to the references is given by $U_{ij}$=f($\Delta Q$ ij*t/$\Delta t$), where $\Delta t$ is the average time elapsed between consecutive explicit sounding. Then in step 1208, the access point continues to access the channel. This is also the case when the average variations amount to null depth flattening is not greater than 3 dB as check in step 1202.

Figure 13:
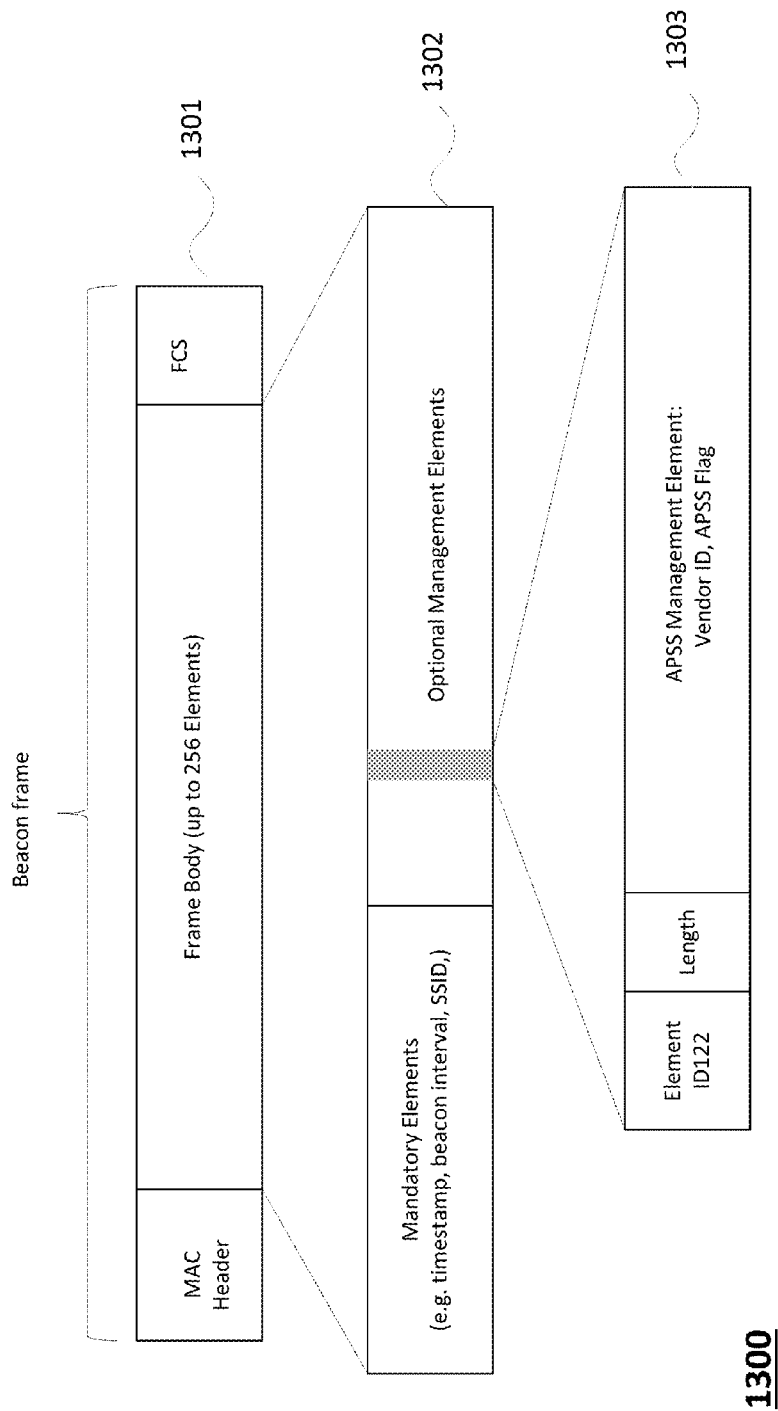
FIG. 13 is a flowchart diagram illustrating method to use Beacon transmission to Broadcast an APSS capability in accordance with some embodiments of the present invention.

FIG. 13 is a format diagram 1300 illustrating a novel tagging of APSS-I-APs' beacon transmission using the beacon frame 1301 as explicit-implicit sounding-capable, thus allowing APSS-I-APs to identify cooperative AP neighbors. In one embodiment, this is done by using the Optional Management Elements field 1302 to transmit an APSS flag 1303 as shown in diagram 1300. In should be noted that other identification methods may be used to indicate an AP as explicit-implicit sounding-capable.

Figure 14:
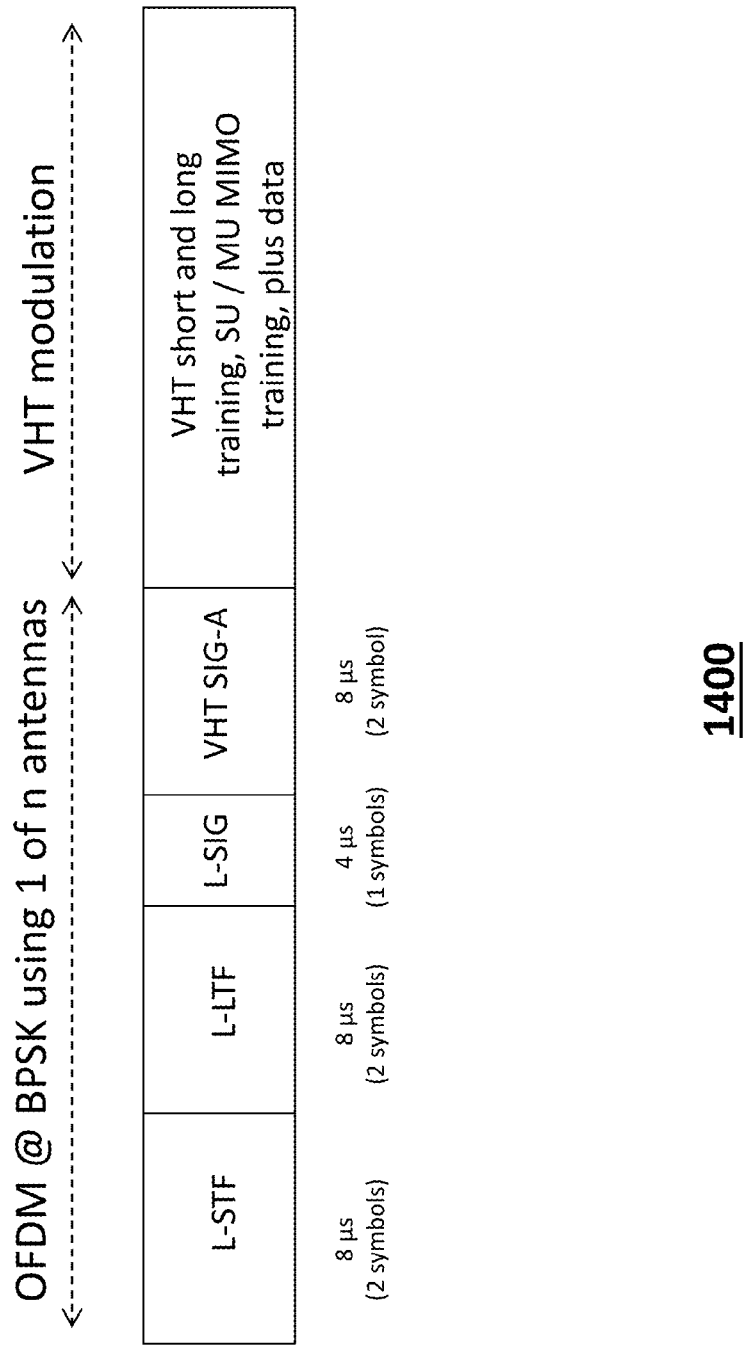
FIG. 14 is a diagram illustrating an 802.11 Preamble field example in accordance with some embodiments of the present invention.

FIG. 14 illustrates the format structure 1400 of a legacy preamble in accordance with the prior art and specifically the IEEE802.11ac standard. The left side illustrates the various fields for orthogonal frequency-division multiplexing (OFDM) at binary phase shift key (BPSK) modulation using 1 of n antennas, whereas the right side illustrates the field for very high throughput (VHT) modulation. The fields may include: legacy short training field (L-STF); legacy long training field (L-LTF); legacy signal (L-SIG); very high throughput signal-A (VHT SIG-A); and VHT short and long training, SU/MU MIMO training, plus data.

Figure 15:
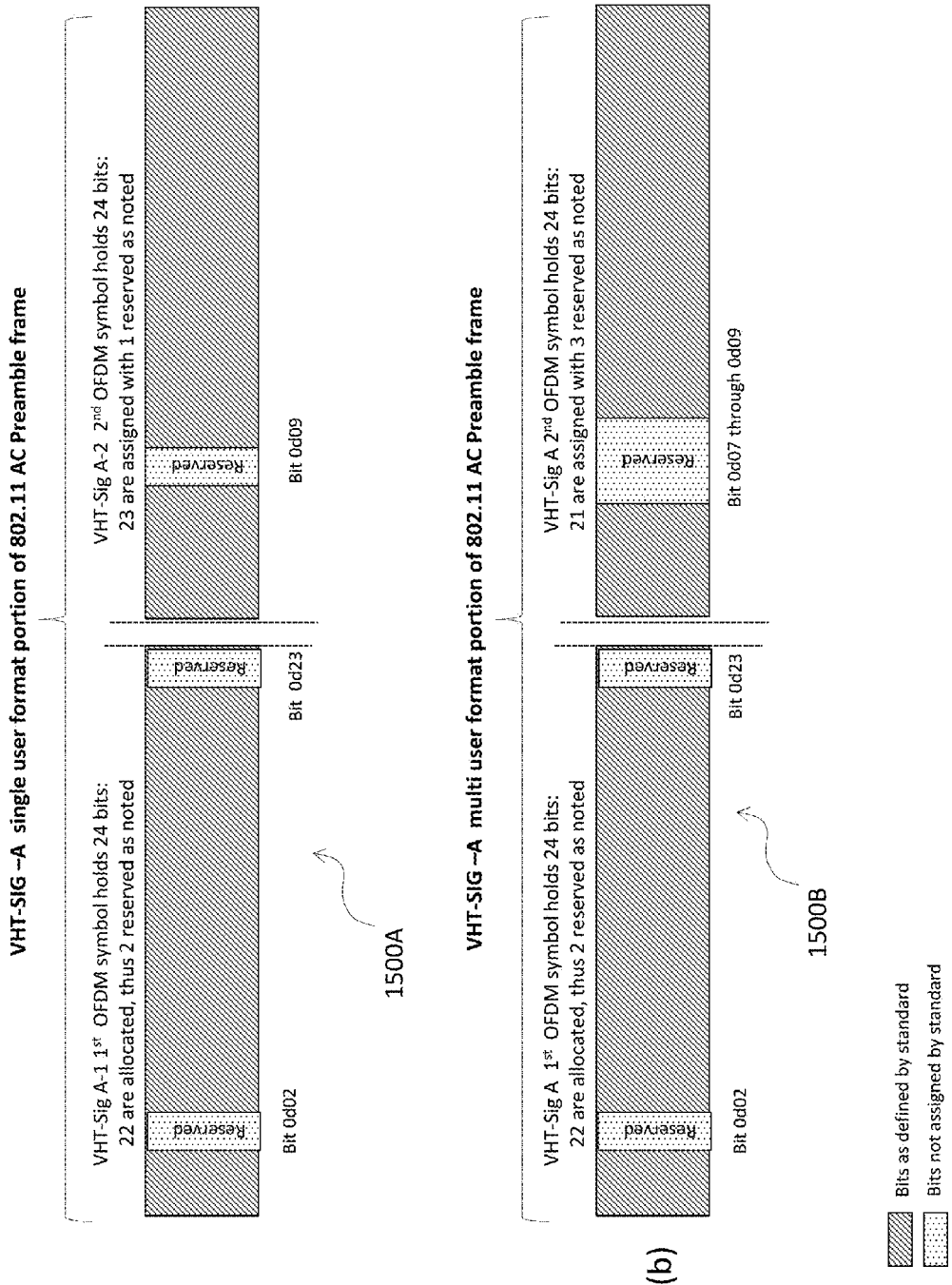
FIG. 15 is a diagram illustrating a Preamble antenna identification tagging in accordance with some embodiments of the present invention.

FIG. 15 is a diagram illustrating a novel tagging of the preamble's unused bits for both SU-MIMO protocol format 1500A and for MU-MIMO protocol format 1500B. Format diagram 1500A illustrates the Very High Throughput—Signal—A (VHT-SIG-A) field for a single user format portion of 802.11 AC Preamble frame. VHT-Sig A-1 first orthogonal frequency-division multiplexing (OFDM) symbol holds 24 bits. 22 bits are allocated by the standard. Two bits (Bit 0d02 and Bit 0d23) may be reserved for tagging the preamble in accordance with embodiments of the present invention. Also illustrated in format diagram 1500A is the VHT-Sig A-2 $2^{nd}$ OFDM symbol which holds 24 bits, wherein 23 bits are assigned by the standard so that one bit (e.g., bit 0d09) may be reserved for tagging the preamble in accordance with embodiments of the present invention.

Similarly, format diagram 1500B illustrates VHT-SIG—A field for a multi user format portion of 802.11 AC preamble frame. VHT-Sig A $1^{st}$ OFDM symbol holds 24 bits: 22 bits are allocated by the standard and so two bits (bit 0d02 and bit 0d23) may be reserved for tagging the preamble in accordance with embodiments of the present invention. Also illustrated in format diagram 1500B is the VHT-Sig A-2 $2^{nd}$ OFDM symbol which holds 24 bits, wherein 21 bits are assigned by the standard so that one bit (e.g., bits 0d07 through bit 0d09) may be reserved for tagging the preamble in accordance with embodiments of the present invention.

In one embodiment two unused bits are required to designate each of the AP's 4 antennas, in another embodiment three bits are used for eight antennas' designation.

Unused bits in (a) SU-MIMO Preamble are 02, 23 of $1^{st}$ OFDM symbol and 09 of $2^{nd}$ OFDM symbol; unused bits in (b) MU-MIMO are 02, 23 of $1^{st}$ OFDM symbol and 07 through 09 of $2^{nd}$ OFDM symbol.

Figure 16:
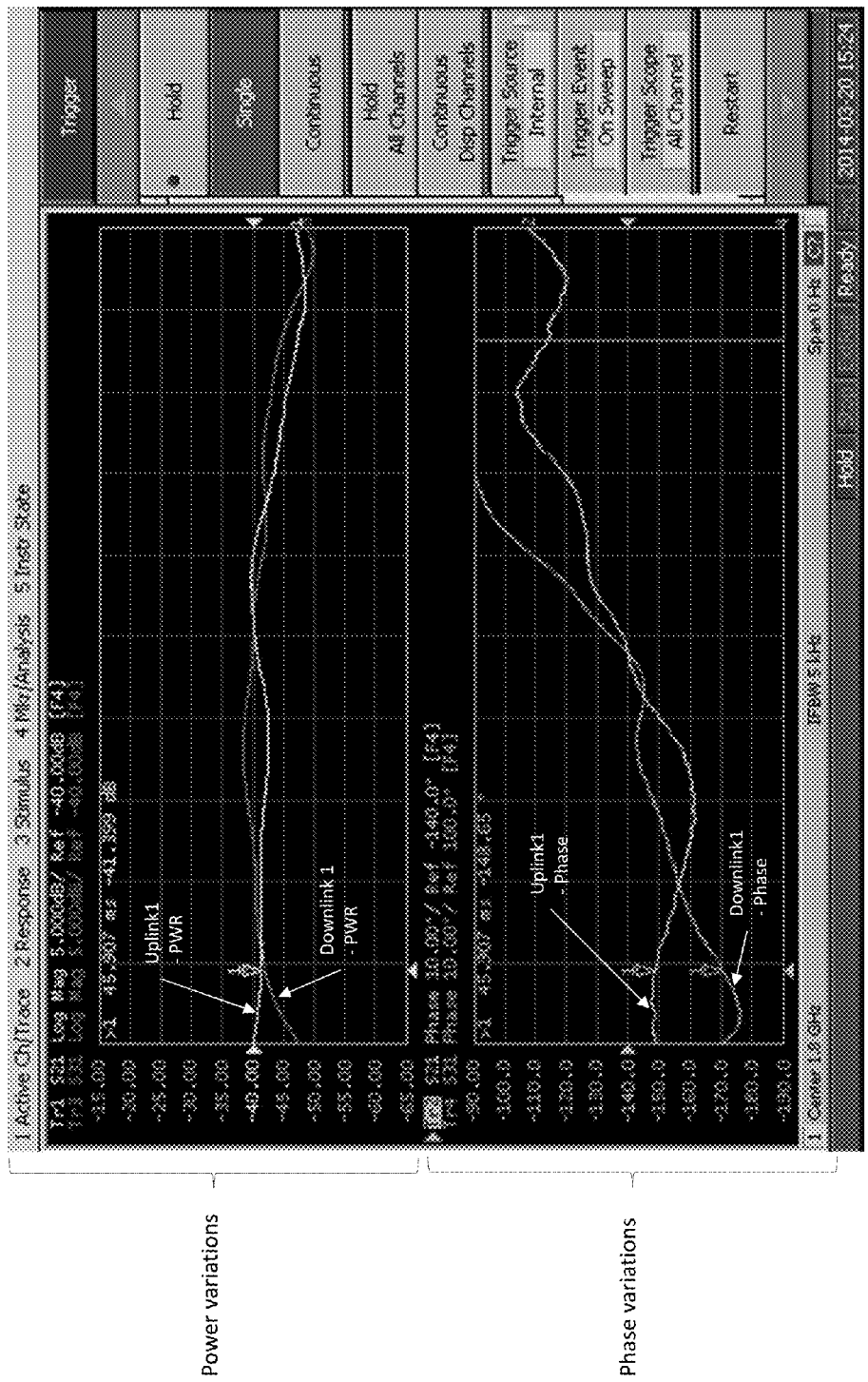
FIG. 16 shows measurement of phase and amplitude differences between up and down link of time, as measured in an office environment, using 802.11 AP and client, done while people are walking around, generating fading environment., in accordance with some embodiments of the present invention.

FIG. 16 illustrates an experimental results carried out with an 802.11 AP deployed at an office environment, where up and down link phase and amplitude swing over time were recorded over time.

Figure 17:
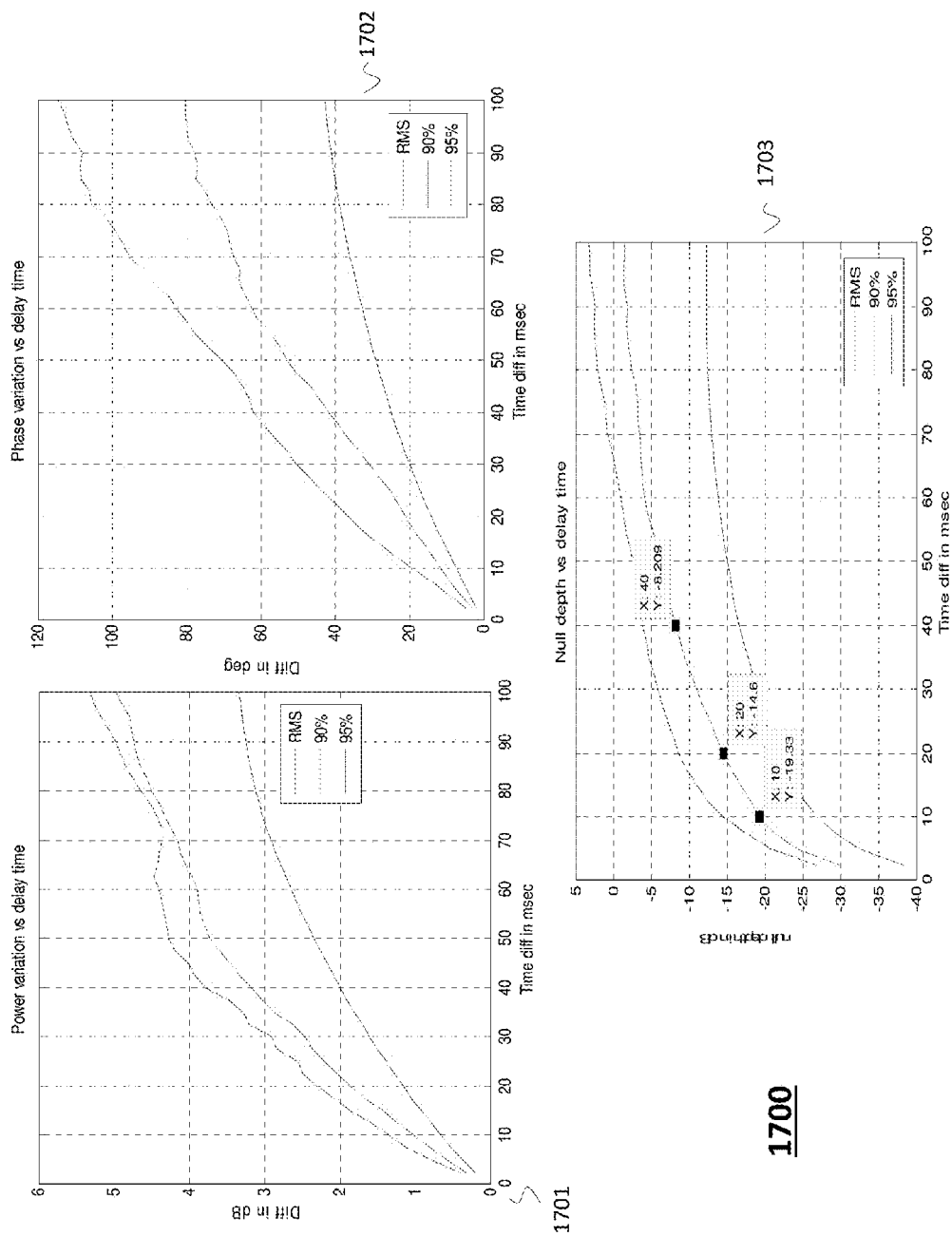
FIG. 17 shows computer simulated graphs illustrating the impact of fading on amplitude and phase differences between up and down link, and the impact it has on null depth, in accordance with some embodiments of the present invention.

FIG. 17 illustrates a zero order correction applied to the test results of phase and amplitude drifts as a function of time for RMS, 90% and 95% of the cases, and the impact on the Power imbalance in dB (1701), the phase drift away from 180 degrees (1702) and the nulling capability (1703), starting at −40 dB close to the sounding event at 0 milli-sec (for 90% curve), and deteriorating to −14 dB at 10 milli-sec.

Figure 18:
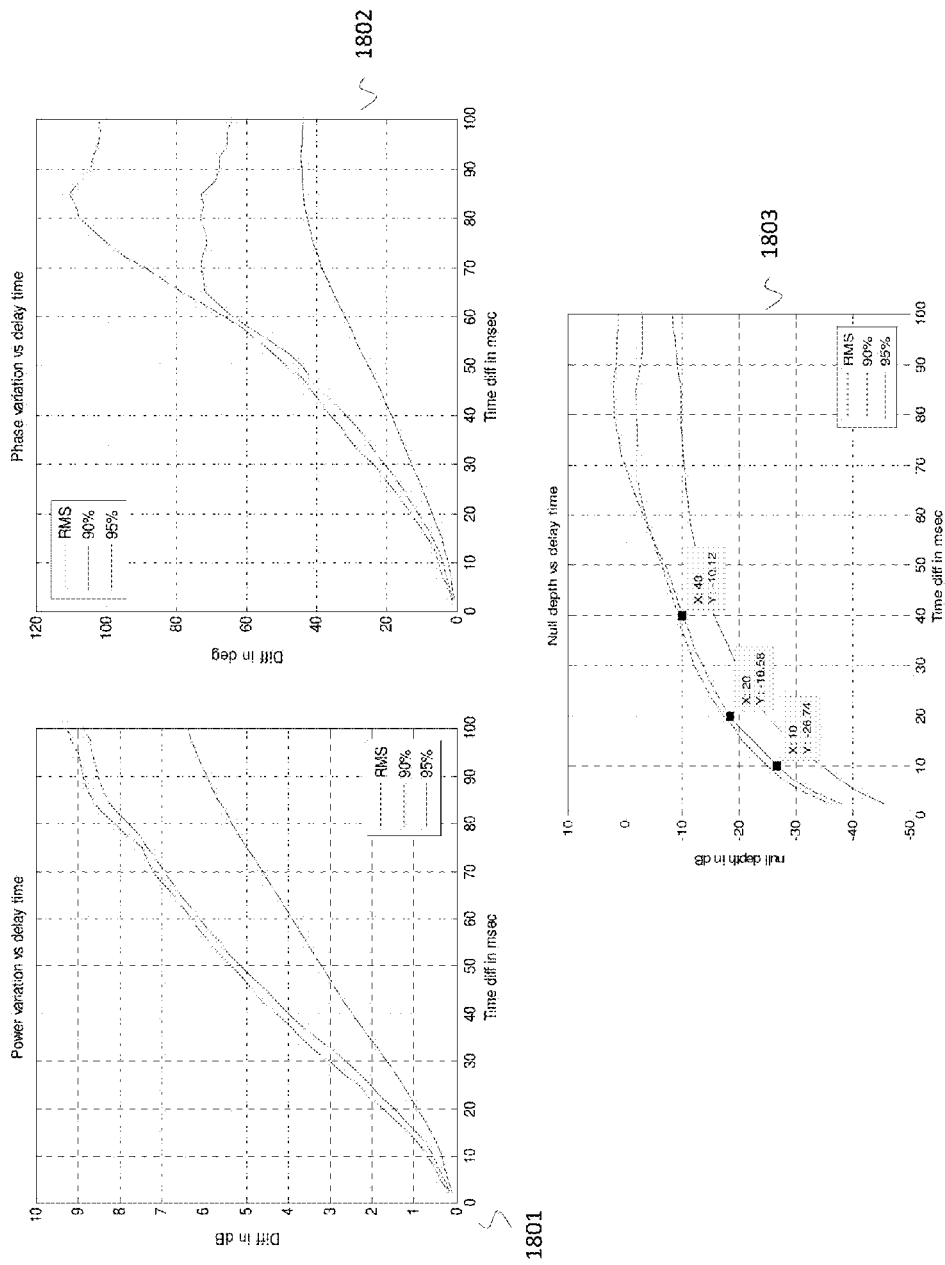
FIG. 18 shows computer simulated graphs illustrating the impact of fading on amplitude and phase differences between up and down link, and the impact it has on null depth, when $1^{st}$ order corrections are implemented, in accordance with some embodiments of the present invention.

FIG. 18 illustrates a first order correction applied to the test results of phase and amplitude drifts as a function of time for RMS, 90% and 95% of the cases, and the impact on the Power imbalance in dB (1801), the phase drift away from 180 degrees (1802) and the nulling capability (1803), starting at −40 dB close to the sounding event at 0 milli-sec (for 90% curve), and deteriorating to some −27 dB at 10 milli-sec, demonstrating better performance than zero order.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." For example, a baseband processor or other processor may be configured to carry out methods of the present invention by for example executing code or software.

The aforementioned flowcharts and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A beamformer access point comprising:
   a plurality of antennas;
   a plurality of radio circuits, each configured to transmit and receive signals via the plurality of antennas, respectively; and
   a baseband processor configured to monitor signals received by the radio circuits and generate a list of co-channel neighboring beamformee access points, each having a plurality of antennas and located within a clear channel assessment (CCA) range of the beamformer access point,
   wherein the baseband processor is further configured to cause the radio circuits to transmit via the respective antennas a beamformer sounding sequence to the neighboring beamformee access points on the generated list of co-channel neighboring beamformee access points, according to a multi-user multiple-input-multiple-output (MU-MIMO) air-protocol, and receive from the neighboring beamformee access points Channel State Information (CSI) providing explicit channel estimation information, and
   wherein the baseband processor of the beamformer access point is further configured to carry out an implicit channel estimation procedure via additional pilot transmissions of the neighboring beamformee access points, appended to the explicit channel estimation information.

2. The access point according to claim 1, wherein the sounding sequence is based on IEEE802.11ac February 2014 air-protocol,
   wherein beamformee nodes of the IEEE802.11ac February 2014 air-protocol are the neighboring access points, wherein the CSI is a compressed beamforming message according to the IEEE802.11ac February 2014 air-protocol and is further arranged in a N×M blocks format, at an order that is known to the beamformer access point, and wherein the implicit channel estimation procedure is carried out by receiving from neighboring beamformee access points N pilots, following a transmission of the compressed beamforming message in an order that enables the beamformer access point to map explicit data to implicit measurements.

3. The access point according to claim 2, wherein the CSI, is ordered in N subgroups, each containing M channel estimation data corresponding to N beamformee and M beamformer antennas, and the implicit channel estimation is acquired by the beamformer access point via the neighboring beamformee access point N pilots, each transmitted through a different one of N antennas thereof, at a same known order in which the CSI N×M blocks were transmitted, so that the beamformer access point maps a given $N_i$ received pilot to a $N_i$ reported subgroup of the CSI message.

4. The access point according to claim 2, wherein the beamformer access point is further configured to store the compressed beamforming data in a first N×M memory space residing in the baseband processor, and further configured to receive the N pilots with each of the plurality of M antennas as implicit measurements, and store said received implicit measurements in a second N×M memory space residing in the baseband processor, wherein each entry $X_{ij}$ of the first N×M memory space is mapped to each entry $Y_{ij}$ of the second N×M memory space, based on the known order of transmission.

5. The access point according to claim 1, wherein the procedure of explicit and implicit sounding processes are performed from time to time and implicit-only sounding is performed before applying a null from one access point to another.

6. The access point according to claim 4, wherein each entry $Y_{ij}$ is compared to the corresponding entry $X_{ij}$ and a calibration factor $Z_{ij}$ is calculated so that $Z_{ij}=Y_{ij}/X_{ij}$.

7. The access point according to claim 6, wherein a set of: $X_{ij}$, $Y_{ij}$, and $Z_{ij}$ is stored as a calibration lookup table and wherein implicit sounding measurements $Y_{ij}$ which are carried out without explicit sounding, are corrected by $Z_{ij}$ factor, before applying nulling weighs calculations.

8. The access point according to claim 7, further configured to access a channel recently being occupied by a downloading listed neighboring access point, via performing channel estimation of the neighboring access point transmission, and applying a receive and a transmit null towards the neighboring access point, wherein the null weights are calculated using the implicit channel estimation, corrected by last stored calibration values $Z_{ij}$.

9. The access point according to claim 8, wherein the nulling calculated for the neighboring beamformee access point that has recently occupied the channel is performed on the neighboring access point antenna which has recently transmitted a Preamble received by the access point.

10. The access point according to claim 2, wherein the baseband processor is configured to keep records of previous explicit and implicit sounding processes done per each of the neighboring beamformee access points, and calculate average differences between consecutive explicit reports, as well as average differences between their corresponding implicit channel estimations.

11. The access point according to claim 8, wherein variations averages, as well as a predicted gradient signs, are considered, as well as time elapsing between two consecutive explicit sounding taking place amongst the access point and each of the listed neighboring access points, in order to calculate a $1^{st}$ order correction.

12. The access point according to claim 9, wherein before using the calibration lookup table reference values $Z_{ij}$, the access point uses the parameters to calculate a $1^{st}$ order correction factor $U_{ij}$, to the $Z_{ij}$ values, so that $Z_{ij}^{()}=Z_{ij}*U_{ij}$ is used to correct the implicit channel estimation.

13. The access point according to claim 1, wherein history of explicit sounding is used to gauge channel variation rate, via calculation of average or standard deviation or higher moments of the channel estimation data, and setting thresholds that categorize the mobility level of the access point due to STAs, or objects and people in their area of coverage.

14. A method for operating a beamformer access point, the method comprising:

transmitting and receiving signals via a plurality of antennas and a plurality of radio circuits;

monitoring the signals received by the radio circuits and generating a list of neighboring co-channel access points, wherein each neighboring co-channel access point has a plurality of antennas and each is further located within a clear channel assessment (CCA) range of the beamformer access point;

instructing the radio circuits to transmit a beamformer sounding sequence to the neighboring access points which are on the list, according to a multi-user multiple-input-multiple-output (MU-MIMO) air-protocol, and receive from the neighboring access points Channel State Information (CSI) which provides explicit channel estimations information, and carry out implicit channel estimations procedure via additional pilots transmissions via the neighboring access points, appended to the explicit channel estimations information.

15. The method according to claim 14, wherein the sounding sequence is based on IEEE802.11ac February 2014 air-protocol, wherein beamformee nodes of the IEEE802.11ac February 2014 air-protocol are the neighboring access points, wherein the CSI is a compressed beamforming message according to the IEEE802.11ac February 2014 air-protocol and is further arranged in a N×M blocks format, at an order that is known to the receiving beamformer, and wherein the implicit channel estimation procedure is carried out by receiving from neighboring beamformee access points N pilots, following a transmission of the compressed-beamforming in an order that enables the beamformer access point to map explicit data to implicit measurements.

16. The method according to claim 15, wherein the CSI, is ordered in N subgroups, each containing M channel estimation data corresponding to N beamformee and M beamformer antennas, and the implicit channel estimation is acquired by the beamformer access point via the neighboring beamformee access point N pilots, each transmitted through a different one of N antennas thereof, at a same known order in which the CSI N×M blocks were transmitted, so that the beamformer access point maps a given $N_i$ received pilot to a $N_i$ reported subgroup of the CSI message.

17. The method according to claim 15, wherein the beamformer access point is further configured to store the compressed beamforming data in a first N×M memory space residing in the baseband processor, and further configured to receive the N pilots with each of the plurality of M antennas as implicit measurements, and store said received implicit measurements in a second N×M memory space residing in the baseband processor, wherein each entry $X_{ij}$ of the first N×M memory space is mapped to each entry $Y_{ij}$ of the second N×M memory space, based on the known order of transmission.

18. The method according to claim 14, wherein the procedure of explicit and implicit sounding processes are performed from time to time and implicit-only sounding is performed before applying a null from one access point to another.

19. The method according to claim 17, wherein each entry $Y_{ij}$ is compared to the corresponding entry $X_{ij}$ and a calibration factor $Z_{ij}$ is calculated so that $Z_{ij}=Y_{ij}/X_{ij}$.

20. The method according to claim 19, wherein a set of: $X_{ij}$, $Y_{ij}$, and $Z_{ij}$ is stored as a calibration lookup table and wherein implicit sounding measurements $Y_{ij}$ which are carried out without explicit sounding, are corrected by $Z_{ij}$ factor, before applying nulling weighs calculations.

21. The method according to claim 20, further configured to access a channel recently being occupied by a downloading listed neighboring access point, via performing channel estimation of the neighboring access point transmission, and applying a receive and a transmit null towards the neighboring access point, wherein the null weights are calculated using the implicit channel estimation, corrected by last stored calibration values $Z_{ij}$.

22. The method according to claim 21, wherein the nulling calculated for the neighboring beamformee access point that has recently occupied the channel is performed on the neighboring access point antenna which has recently transmitted a Preamble received by the access point.

23. The method according to claim 15, further comprising keeping records of previous explicit and implicit sounding processes done per each of the neighboring beamformee access points, and calculate average differences between consecutive explicit reports, as well as average differences between their corresponding implicit channel estimations.

24. The method according to claim 21, wherein variations averages, as well as a predicted gradient signs, are considered, as well as time elapsing between two consecutive explicit sounding taking place amongst the access point and each of the listed neighboring access points, in order to calculate a $1^{st}$ order correction.

25. The method according to claim 22, wherein before using the calibration lookup table reference values $Z_{ij}$, the access point uses the parameters to calculate a $1^{st}$ order correction factor $U_{ij}$, to the $Z_{ij}$ values, so that $Z_{ij}^{(1)}=Z_{ij}*U_{ij}$ is used to correct the implicit channel estimation.

26. The method according to claim 14, wherein history of explicit sounding is used to gauge channel variation rate, via calculation of average or standard deviation or higher moments of the channel estimation data, and setting thresholds that categorize the mobility level of the access point due to STAs, or objects and people in their area of coverage.

\* \* \* \* \*